United States Patent
Jones

(10) Patent No.: US 9,689,195 B2
(45) Date of Patent: *Jun. 27, 2017

(54) VACUUM INSULATING GLASS UNIT WITH VISCOUS EDGE SEAL

(71) Applicant: Robert S. Jones, Delafield, WI (US)

(72) Inventor: Robert S. Jones, Delafield, WI (US)

(*) Notice: Subject to any disclaimer, the term of this patent is extended or adjusted under 35 U.S.C. 154(b) by 1028 days.

This patent is subject to a terminal disclaimer.

(21) Appl. No.: 13/630,817

(22) Filed: Sep. 28, 2012

(65) Prior Publication Data

US 2013/0101759 A1 Apr. 25, 2013

Related U.S. Application Data

(63) Continuation-in-part of application No. 13/451,783, filed on Apr. 2, 2012, now abandoned, and a
(Continued)

(51) Int. Cl.
*E06B 3/663* (2006.01)
*E06B 3/66* (2006.01)
*E06B 3/673* (2006.01)

(52) U.S. Cl.
CPC ........ *E06B 3/6612* (2013.01); *E06B 3/66304* (2013.01); *E06B 3/66328* (2013.01);
(Continued)

(58) Field of Classification Search
CPC ... Y02B 80/24; E06B 3/6612; E06B 3/66328; E06B 3/66333; E06B 3/663046; E06B 2003/66385; E06B 3/66304
See application file for complete search history.

(56) References Cited

U.S. PATENT DOCUMENTS 1,785,696 A * 12/1930 Hackett ............ B32B 17/10302
156/101
3,061,895 A 11/1962 Kleinhans
(Continued)

FOREIGN PATENT DOCUMENTS

CH 672612 12/1989
EP 1018493 A1 7/2000
(Continued)

OTHER PUBLICATIONS

English language translation of the Abstract JP 11-199277 A, Jul. 27, 1999, Asahi Glass Co., Ltd.
(Continued)

*Primary Examiner* — Donald J Loney

(57) ABSTRACT

Vacuum insulating glass (VIG) units and edge seals for VIG units are provided. The VIG units include an edge seal that includes a viscous material, and is configured to allow the glass sheets to move laterally relative to one another when the glass sheets experience differential thermal strain and further configured such that viscous shear occurs within at least a portion of the viscous material when there is relative lateral movement between the glass sheets. The edge seals comprise a cavity that contains at least a portion of the viscous material, wherein at least a portion of a boundary defining the cavity is reversibly expandable and collapsible such that the viscous material and the cavity are configured to maintain volume compatibility when one or both of the viscous material and the cavity undergo a temperature-induced volume change.

11 Claims, 21 Drawing Sheets

Related U.S. Application Data continuation-in-part of application No. 13/563,970, filed on Aug. 1, 2012, said application No. 13/451,783 is a continuation of application No. 13/046,858, filed on Mar. 14, 2011, now Pat. No. 8,182,887.

(60) Provisional application No. 61/545,174, filed on Oct. 9, 2011, provisional application No. 61/581,209, filed on Dec. 29, 2011, provisional application No. 61/587,746, filed on Jan. 18, 2012, provisional application No. 61/588,860, filed on Jan. 20, 2012, provisional application No. 61/624,582, filed on Apr. 16, 2012, provisional application No. 61/652,946, filed on May 30, 2012, provisional application No. 61/670,857, filed on Jul. 12, 2012, provisional application No. 61/682,909, filed on Aug. 14, 2012, provisional application No. 61/694,395, filed on Aug. 29, 2012, provisional application No. 61/696,105, filed on Aug. 31, 2012, provisional application No. 61/318,315, filed on Mar. 27, 2010, provisional application No. 61/327,058, filed on Apr. 22, 2010.

(52) U.S. Cl.
CPC ........ *E06B 3/6733* (2013.01); *E06B 3/66333* (2013.01); *E06B 2003/66385* (2013.01); *Y02B 80/24* (2013.01)

(56) References Cited

U.S. PATENT DOCUMENTS

| | | | |
|---|---|---|---|
| 3,399,087 A | | 8/1968 | Scigliano |
| 3,424,836 A | * | 1/1969 | McKelvey ......... E06B 3/67321 118/316 |
| 3,441,924 A | | 4/1969 | Peek et al. |
| 3,759,771 A | | 9/1973 | Battersby |
| 4,092,290 A | * | 5/1978 | Bowser ................ C09J 123/22 524/443 |
| 4,144,097 A | * | 3/1979 | Chambers ........... H01L 31/055 136/247 |
| 4,151,696 A | | 5/1979 | Knights et al. |
| 4,215,164 A | | 7/1980 | Bowser |
| 5,116,686 A | | 5/1992 | Schoen |
| 5,270,084 A | | 12/1993 | Parker |
| 5,632,122 A | | 5/1997 | Spinks |
| 6,291,036 B1 | | 9/2001 | Wang et al. |
| 6,301,858 B1 | * | 10/2001 | Crandell ............. E06B 3/66342 428/34 |
| 6,365,242 B1 | | 4/2002 | Veerasamy |
| 6,399,169 B1 | | 6/2002 | Wang et al. |
| 6,444,281 B1 | | 9/2002 | Wang et al. |
| 6,503,583 B2 | | 1/2003 | Nalepka et al. |
| 6,541,084 B2 | | 4/2003 | Wang |
| 6,649,695 B1 | | 11/2003 | Rath et al. |
| 7,232,497 B2 | | 6/2007 | Lindberg et al. |
| 7,817,328 B2 | | 10/2010 | Millett et al. |
| 7,919,157 B2 | | 4/2011 | Cooper |
| 2006/0057312 A1 | * | 3/2006 | Watanabe ............... B32B 17/06 428/34 |
| 2008/0221370 A1 | | 9/2008 | Lange et al. |
| 2009/0120035 A1 | * | 5/2009 | Trpkovski ........... E06B 3/66309 52/786.13 |
| 2009/0151854 A1 | | 6/2009 | Cooper |
| 2009/0155499 A1 | | 6/2009 | Cooper |
| 2010/0034996 A1 | | 2/2010 | Mott et al. |
| 2010/0175347 A1 | | 7/2010 | Bettger et al. |
| 2010/0178439 A1 | | 7/2010 | Bettger et al. |
| 2011/0236609 A1 | | 9/2011 | Jones |
| 2012/0315409 A1 | | 12/2012 | Jones |

FOREIGN PATENT DOCUMENTS

| | | |
|---|---|---|
| JP | 10306658 | 11/1998 |
| JP | 11-199277 A | 7/1999 |
| JP | 11349358 | 12/1999 |
| KR | 10-2004-0041161 A | 5/2004 |
| WO | WO 9612862 | 5/1996 |

OTHER PUBLICATIONS

English translation of the Abstract of CH 672612, Dec. 15, 1989, Müller.
Extended European Search Report issued in EP 11766346.8, Sep. 3, 2013.
English language machine translation of JP 10306658, Nov. 17, 1998, Sugata et al.
Schmidt, Sealants for IG Units Performance Parameters and Requirements, Glass Processing Days, Sep. 13, 1997, pp. 247-251.
Products for the Glass Industry, Printed from http://www.wessingtongroup.com/index.php?show=igi on Oct. 16, 2011.
Primary Sealant, Printed from http://www.dgsgroup.co.uk/catalogues/primary/index.html on Oct. 16, 2011.
Tremco JS680, Printed from http://www.tremco-illbruck.co.uk/products/00965_index.html on Oct. 16, 2011.
Product Information—Insulating Glass Primary Sealant GD 115, Kömmerling Chemische Fabrik GmbH (Publication date unknown to applicant).
Insulating Glass Manual, Dow Corning, 2010.
Oppanol PIB by BASF Brochure, The Global All-Rounder, Jan. 2010.
BASF's Oppanol Polyisobutylenes Brochure, 2003.
Customer Success Story, BASF (Publication date unknown to applicant).
International Search Report and Written Opinion received in PCTUS2011028264, Nov. 28, 2011.
English translation of Notice of Reasons for Rejection issued in JP Application No. 2013501296, Sep. 2, 2014.
International Search Report and Written Opinion issued in PCT/US2012/057957, Mar. 20, 2013.
International Search Report and Written Opinion issued in PCT/US2012/049116, Sep. 14, 2012.

* cited by examiner

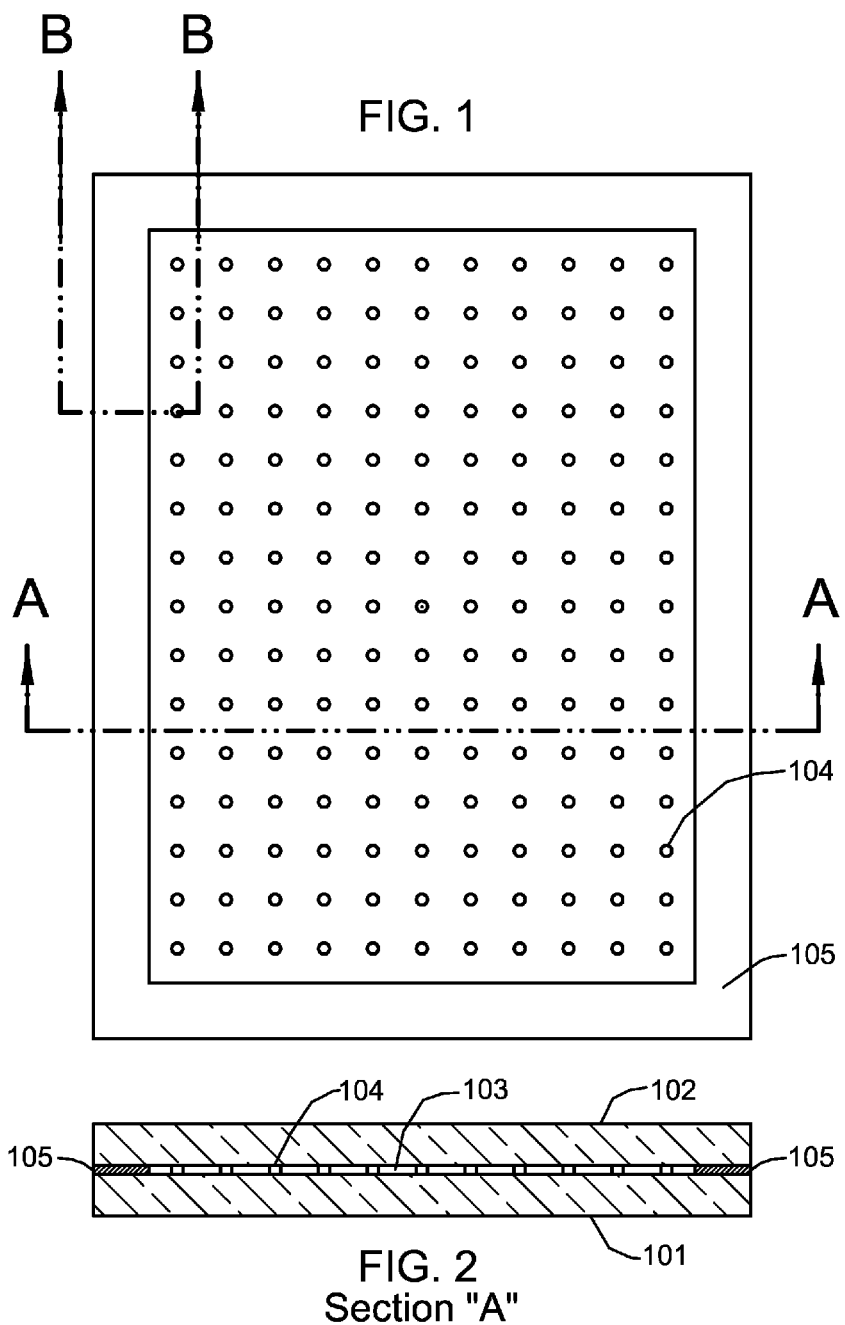

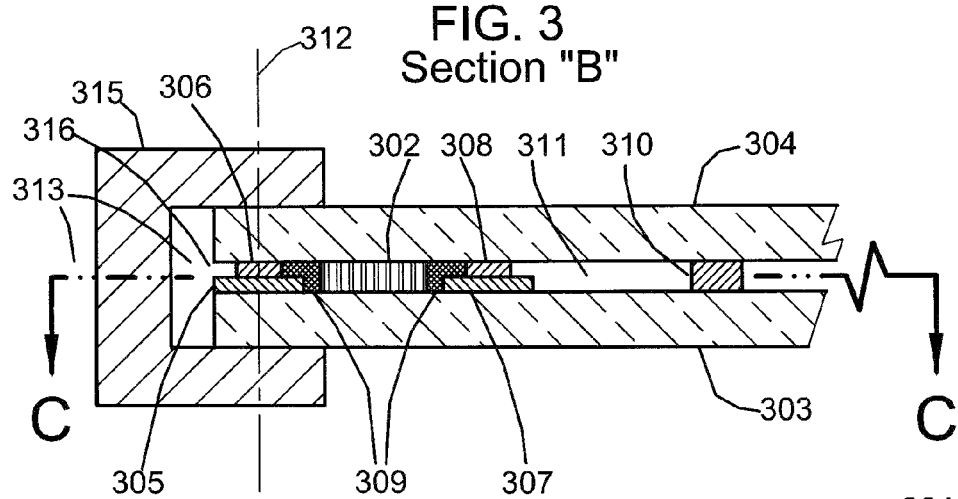
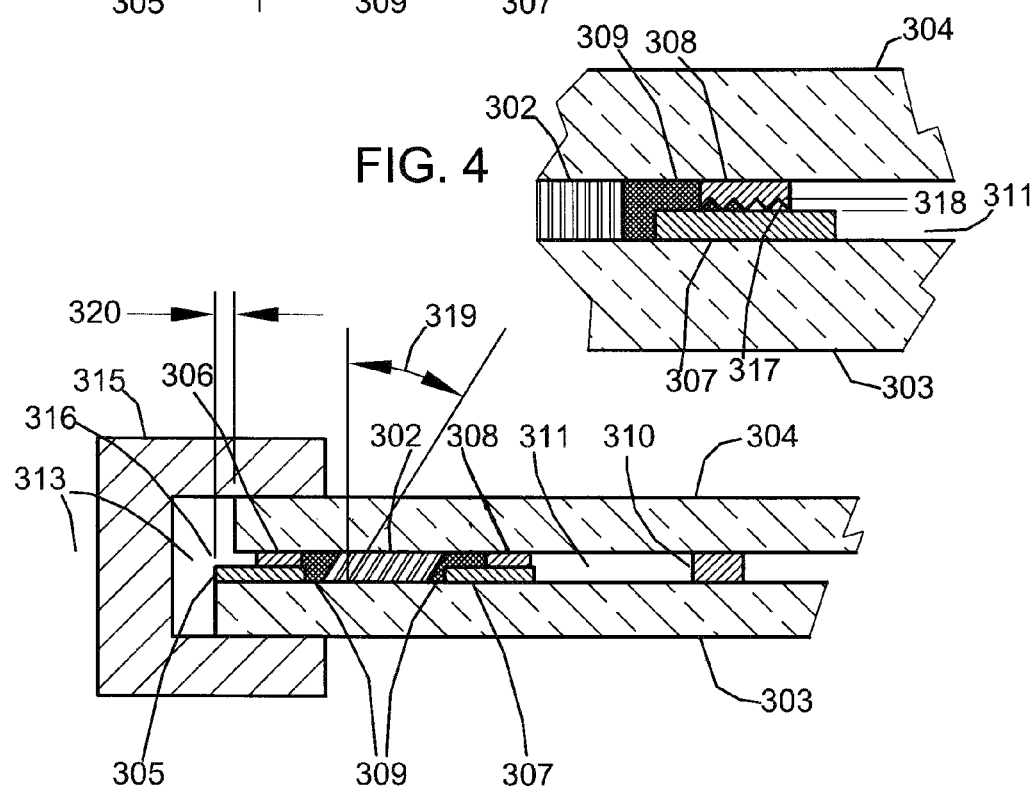

Section "C"

Section "B"

Section "B"

Section "B"

Section "B"

Section "D"

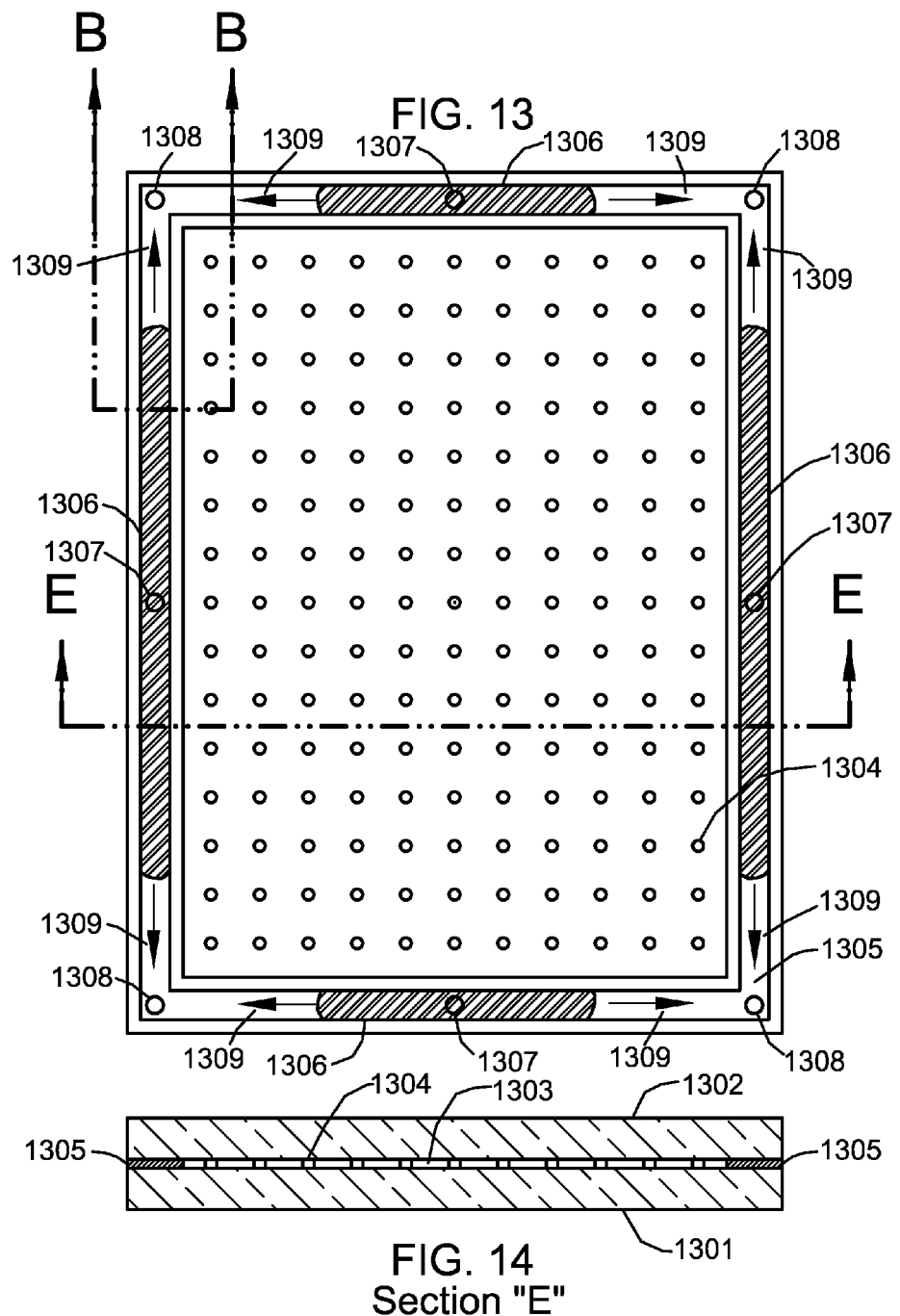

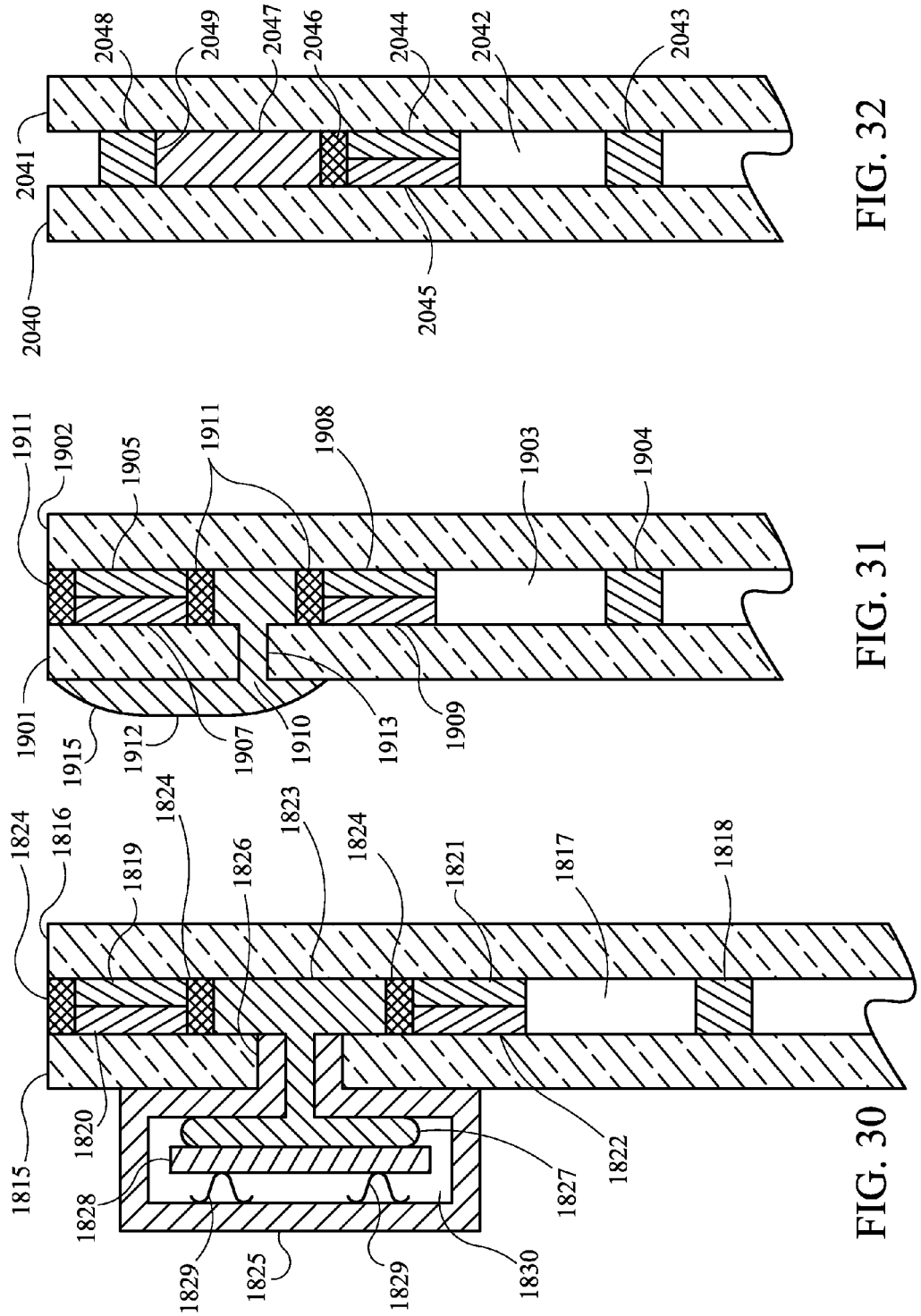

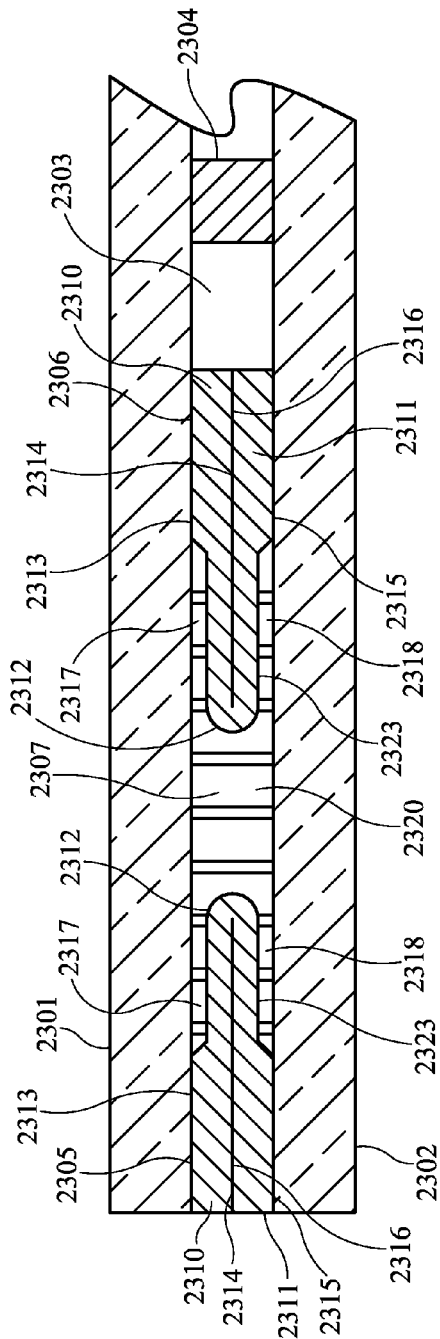
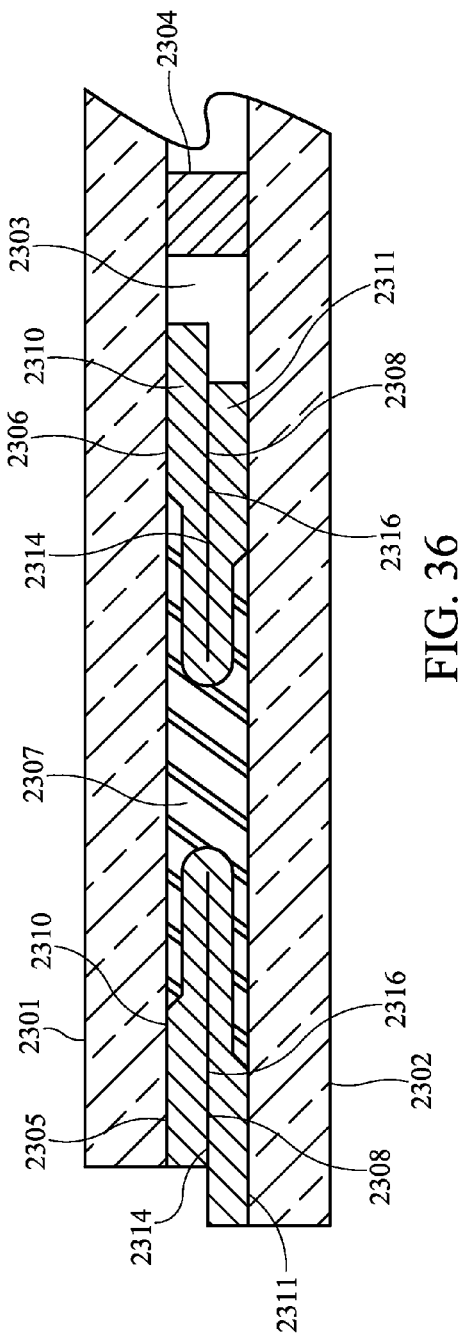
FIG. 35
FIG. 36

VACUUM INSULATING GLASS UNIT WITH VISCOUS EDGE SEAL

CROSS REFERENCE TO RELATED APPLICATIONS

The present application is a continuation-in-part of U.S. patent application Ser. No. 13/451,783, entitled "Vacuum Insulating Glass Unit with Viscous Edge Seal" and filed on Apr. 20, 2012, which is a continuation of U.S. Pat. No. 8,182,887 B2 issued on May 22, 2012, and entitled "Vacuum Insulating Glass Unit with Viscous Edge Seal", which claim the benefit of priority of the following U.S. provisional patent applications: Ser. No. 61/318,315, filed on Mar. 27, 2010; Ser. No. 61/327,058, filed on Apr. 22, 2010, the entire disclosures of which are incorporated herein by reference. The present application is a continuation-in-part of U.S. patent application Ser. No. 13/563,970, filed on Aug. 1, 2012, the entire disclosure of which is incorporated herein by reference. The present application claims the benefit of priority of the following U.S. provisional applications: Ser. No. 61/545,174, filed on Oct. 9, 2011, and entitled "Improvements to Support Spacers for Vacuum Insulated Windows;" Ser. No. 61/581,209, filed on Dec. 29, 2011, and entitled "Improvements to Viscous Edge Seal for Vacuum Insulated Windows;" Ser. No. 61/587,746, filed on Jan. 18, 2012, and entitled "Hydraulic Sealing Elements for Viscous Sealed Vacuum Insulated Windows;" Ser. No. 61/588,860, filed on Jan. 20, 2012, and entitled "Elements for Viscous Sealed Vacuum Insulated Windows;" Ser. No. 61/624,582, filed on Apr. 16, 2012, and entitled "Vacuum Insulated Window with Viscous Edge Seal;" Ser. No. 61/652,946, filed on May 30, 2012, and entitled "Vacuum Insulating Windows with Viscous Edge Seals Part B;" Ser. No. 61/670,857, filed on Jul. 12, 2012, and entitled "Polymer Spacers Formed as Sheets for Vacuum Insulated Glass;" Ser. No. 61/682,909, filed on Aug. 14, 2012, and entitled "Vacuum Insulated Window with Viscous Edge Seals Part C;" Ser. No. 61/694,395, filed on Aug. 29, 2012, and entitled "Vacuum Insulated Window with Viscous Edge Seals Part D;" Ser. No. 61/696,105, filed on Aug. 31, 2012, and entitled "Vacuum Insulated Window with Viscous Edge Seals Part E;" the entire disclosures of which are incorporated herein by reference.

BACKGROUND

Gas Permeation.

Because it plays a central role in this invention the concept of gas permeation is presented here.

Without continual or periodic pumping down, the initial low pressure of any vacuum contained in a vessel will increase as atmospheric gas permeates through the materials of which the vessel is made. The rate of pressure increase will depend on the rate of permeation. Therefore the service life of a vacuum insulating glass (VIG) unit is not indefinite but can be extended, provided there is not a failure of the edge seal, by periodic pumping down through a permanently attached or temporarily attachable pump out port.

With regard to permeation Roth (1994, p 6-7) states (references cited: other publications):

Gases have the possibility to flow through solids even if the openings present are not large enough to permit a regular flow. The passage of a gas into, through and out of a barrier having no holes large enough to permit more than a small fraction of the gas to pass through any one hole is known as permeation. The steady state rate of flow in these conditions is the permeability coefficient or simply permeability. This is usually expressed in cubic centimeters of gas at STP [standard temperature and pressure] flowing per second through a square centimeter of cross section, per millimeters of wall thickness and 1 torr of pressure drop across the barrier . . . . An ideal vacuum should maintain forever the vacuum (pressure) reached at the moment of its separation from the pumps. Any real chamber presents a rise in pressure after being isolated from the pumping system. The pressure rise is produced by the gas which permeates from outside into the chamber . . . .

Also in regard to permeation O'Hanlon (2003, p 70) states (references cited: other publications):

Permeation is a three step process. Gas first absorbs on the outer wall of a vacuum vessel, diffuses through the bulk, and lastly desorbs from the interior wall. Permeation through glass, ceramic, and polymeric materials is molecular. Molecules do not dissociate on absorption. Hydrogen does dissociate on metal surfaces and diffuses as atoms that recombine before desorption on the vacuum wall.

Ceramic glasses typically used for VIG units have permeability to atmospheric gases in the range of $10^{-12}$ to $10^{-13}$ $cm^3 \cdot mm/(cm^2 \cdot sec \cdot torr)$.

Vacuum Insulating Glass Units.

Vacuum insulating glass units are known in the art. For example, see U.S. Pat. Nos. 5,664,395; 5,657,607; 5,891,536; 5,902,652; 6,444,281 B1; 6,291,036; and 7,141,130 B2 the disclosures of which are all hereby incorporated herein by reference.

Vacuum insulating glass (VIG) units comprise two substantially parallel spaced apart glass sheets with a vacuum in between at a pressure less than atmospheric pressure. Between the glass sheets are visually nonintrusive spacers that maintain the vacuum space by resisting compressive atmospheric pressure. Common to all VIG units is an edge seal that seals the edge gap between the glass sheets and maintains the vacuum by presenting a low permeability barrier.

Thermal heat transfer via convection and conduction cannot occur through a vacuum. Consequently the energy and associated cost savings that can result from the use of VIG units in applications such as windows, doors, and skylights can be on the order of ten times greater than for inert gas filled thermal pane units, which have an inert gas such as argon or krypton at atmospheric pressure between their glass sheets.

There are serious unresolved performance and reliability problems that continue to hamper development of commercially viable VIG units, forestalling the significant energy savings that will result should they ever replace inert gas filled thermal pane. Chief among them is edge seal failure and sudden brittle fracture of the relatively non-ductile glass sheets. These failures are caused by large stresses resulting from differential thermal expansion and contraction (or "differential thermal strain") of the thermally separated glass sheets. The patent record reveals an ongoing intensive effort to solve this problem by employing more flexible edge seal designs. The effort is spurred by a quest to capitalize on market demand for more energy efficient buildings. The demand is driven by a pressing need to forestall the mounting dangers of global warming by reducing green house gas emissions.

Steven Chu, Secretary, U.S. Department of Energy, stated at the Caltech Commencement, Jun. 12, 2009:

There is a growing realization that we should be able to build buildings that will decrease energy use by 80 percent with investments that will pay for themselves in less than 15 years. Buildings consume 40 percent of the energy in the U.S., so that energy efficient buildings can decrease our carbon emissions by one third.

At the time of this writing, residential buildings account for 22 percent of U.S. energy consumption, commercial 18 percent. Of the 22 percent residential energy consumption, 42 percent is a result of residential heating and cooling. Buildings use 72 percent of the nation's electricity and 55 percent of its natural gas. Buildings are responsible for approximately 40 percent of $CO_2$ emissions in the U.S., and approximately 2,300 teragrams (Tg or million tonnes (MMT)) $CO_2$ equivalent (source U.S. Department of Energy).

The U.S. Green Building Council has instituted an internationally recognized green building certification system known as Leadership in Energy and Environmental Design or LEED certification that promotes energy savings, water efficiency, $CO_2$ emissions reduction, and improved indoor environmental quality. LEED standards promote greater use of natural light and visibility to the outdoors. VIG units make this possible without being at cross purposes with LEED energy saving and $CO_2$ emissions reduction standards. VIG units greatly reduce sound transmission, which improves the quality of living and working environments.

Because there is a vacuum between them, the glass sheets in a VIG unit are thermally isolated from one another to a far greater degree than those in inert gas units. As a result, the differential thermal strain between the glass sheets of a VIG unit caused by indoor and outdoor temperature differences in climates with large temperature extremes is far greater than for inert gas units. In a VIG unit with a rigid edge seal that joins both sheets of glass these differences in thermal strain meet at the unit's edges where they are constrained by compatibility. The result can be very large values of stress in the relatively non-ductile glass sheets and within the edge seal and its bond to the glass sheets.

The large stresses that can develop in the glass sheets of a VIG unit with a rigid edge seal can become so high that one or both ceramic glass sheets may fail suddenly in brittle fracture. This problem is exacerbated by ceramic glass's sensitivity to loss of strength from scratches and abrasions, which can precipitate breakage. If a VIG unit is a floor to ceiling window on the $94^{th}$ floor of a building and fails suddenly in brittle fracture the consequences could exceed the cost of the unit's replacement and include injury or loss of life.

Although ceramic glass has a number of negative physical properties that are disadvantages in VIG construction, the lack of materials with its unique positive physical properties makes it very difficult to circumvent ceramic glass as the preferred transparent material for VIG units. The negative physical characteristics are brittleness, low ductility, low tensile strength, and a high a modulus of elasticity. The positive characteristics are very high rigidity, resistance to creep deformation under continuous loads, hardness, and very importantly ceramic window glass such as soda-lime glass has very low gas permeability. These positive properties make ceramic glass the preferred material for VIG units, which are subject to continuous flexural loads from atmospheric pressure and which must maintain service vacuum pressures for decades.

If ceramic glass was more ductile and had greater tensile strength then many of the problems plaguing VIG development would be greatly mitigated. Given that at present there is no suitable alternative to ceramic glass, the only available avenue for progress in VIG development is improved edge seal design. A number of United States Patent Application Publications disclose more flexible edge seal designs, which are attempts to mitigate many of the current problems with VIG performance, assembly, reliability, and safety.

In most of the VIG units described in the art the distance between the glass sheets is necessarily very much smaller than the distance between the glass sheets of inert gas filled thermal pane units and usually less than 0.08 inch. Despite the fact that close spacing of VIG unit glass sheets exacerbates the problem of accommodating differential thermal strain between them, close spacing of VIG unit glass sheets is desirable because spacers need to be small in order to be visually nonintrusive. Small spacers conduct less thermal energy. Close spacing of VIG unit glass sheets reduces the time required to pump down the vacuum, which reduces production costs. Spacers may be or include round disks, cylinders, micro sized particles, or even nanoparticles that may or may not be imbedded within the glass sheets.

In contrast to the typical distances between the glass sheets of VIG units, the distances between the glass sheets of inert gas units is chosen to minimize heat transmission from conduction and convection. That optimal spacing is between 0.625 and 0.75 inch. Because the distances between the glass panes of inert gas thermal pane windows are much greater than for VIG units, the stresses that develop in their edge seals are less than those for VIG units given the same lateral displacement between the glass sheets and similar sealing materials. Therefore the smaller differential thermal strains that develop between the glass sheets of inert gas units as compared to VIG units can be accommodated by simple flexible elastic seals that need not resist collapse under one atmosphere of pressure and that need not maintain a one atmosphere pressure difference for decades.

The rigid ceramic solder glass or glass frit edge seals that are currently used in VIG units and that are known in the art present serious problems. Seals of this type are disclosed by U.S. Pat. Nos. 5,664,395 and 5,657,607. The advantages of ceramic solder glass edge seals are their very low gas permeability and strong bond to ceramic glass substrates. Their disadvantage is brittleness and tendency to crack or fracture in climates with large temperature extremes such as occur in North America. It takes only a very small invisible crack or breach in a VIG edge seal to drastically reduce a unit's service life and to make repair infeasible.

In the process of forming rigid ceramic solder glass edge seals the ceramic glass sheets must be heated above a temperature that will remove tempering and introduce unwanted stresses within the glass sheets. The long heating and cooling times associated with this process increase manufacturing costs. The high assembly temperatures require the spacers to be of a material that can withstand those temperatures. This limits the range of suitable spacer materials and excludes materials with lower coefficients of thermal conductivity or higher creep resistance. U.S. Pat. Nos. 6,701,749; 6,558,494; 6,541,083; 6,641,689; 6,635,321; 6,478,911; 6,365,242; and 6,336,984 disclose methods that reduce the assembly temperatures of VIG units and allow the glass sheets to retain some but not all of their tempering.

Rigid edge seals can cause bulging out of a VIG unit's glass sheets. For example, if it is colder outdoors the outer glass sheet will contract causing both the inner and outer glass sheets to bulge inward toward the interior of the building increasing the likelihood of fracture. Bulging noticeably distorts reflections creating an objectionable non aesthetic fun house environment.

Nippon Sheet Glass produces commercial VIG units with ceramic solder glass edge seals under the trade name Spacia. U.S. Pat. Nos. 5,664,395, and 5,902,652 also describe such VIG units. Service information published for these units by Nippon Sheet Glass reveal many of the problems presented above. The service information states in part (Nippon 2003) (references cited: other publications):

Precaution for Use and Maintainance
1. When wired glass type is used in different application from conventional window, please contact us before use, to avoid of the trouble clue to thermal breakage.
2. Don't paste the film and paper on SPACIA. It may brings about thermal breakage. Slight dislocation and occasional omissions of pillars, even if they are found, are negligible problem in terms of product performance,
3. SPACIA is required to use in temperature condition that its difference between IN and OUT is preferably less than 35° C.
4. Don't touch on SPACIA with metallic or ceramic hard sharp. Deep scratches sometimes lead to glass breakage.
5. Some deformation of reflective image is unavoidable for process reasons and for the occasional warpage of glass in case of a big temperature difference between IN and OUT, which is based on its higher thermal insulation. [sic]

The problems associated with rigid edge seals can be reduced if a flexible seal is used. However, in comparison to stationary rigid seals, it is more difficult to achieve low permeability and leak rates for seals that accommodate or transmit motion. This difficulty exists for various reasons that include the following: flexible materials generally have higher gas permeability than rigid materials, and it is difficult to form lasting reliable bonds or tight fits between flexible elastic materials and the more rigid materials or configurations of vacuum vessels. The VIG edge seals disclosed by the United States Patent Application Publications discussed below are meant to be more flexible and ductile than rigid solder glass seals.

The problems with rigid ceramic solder glass edge seals and rigid edge seals for VIG units discussed above are enumerated by United States Patent Application Publications Nos. US 2008/0166570 A1 and US 2009/0155499 A1. These publications disclose designs that mitigate, but that do not eliminate, the above described problems by introducing metal as a bridging material between the edges of the glass sheets. Metal has greater ductility and flexibility than ceramic solder glass. This allows some movement of the edges of the ceramic glass sheets relative to one another under differential thermal strain. This results in less stress and likelihood of fracture. Some of the metal seals that are disclosed by the above publications are bent and folded into spring like forms that further increase their flexibility. These publications show some of the metal seals as being entirely between the glass sheets so that one of their dimensions is limited by the small distance between the glass sheets. This requires tight folds in the folded over metal forms and places limitations on the strains that can be accommodated without exceeding the elastic limit of the metals. Given the number of cycles of loading and unloading that would occur on a daily basis year after year because of expansion and contraction of the glass sheets, the metal seals disclosed by the above publications would very likely experience strain or work-hardening and become increasingly less ductile; possibly to a point where cracks or fissures would develop that would admit air into the vacuum at an unacceptable rate, shortening the service life of a VIG unit to years as opposed to decades. In regard to work-hardening of flexible metal joints that seal vacuums Jousten (2008, p 785) states (references cited: other publications):

For high—and ultrahigh—vacuum equipment, flexible metal elements are used, which are welded or brazed to the flanges. Such elements include hydraulically formed bellows (the longitudinal section is wavy) and diaphragm bellows (diaphragms, welded at the outside and inside perimeters). Because they are made of metal, every component of this type is subject to work-hardening and thus wear, depending on the number of working cycles.

The folded over forms disclosed by the above publications are only effective as springs in one direction, whereas differential thermal strain in the glass sheets of a VIG unit occurs in two dimensions.

United States Patent Application Publication No. US 2009/0155499 A1 discloses that the contemplated metal edge seals may be bonded to the glass substrates by methods requiring lower temperatures than those required for solder glass seals. The methods and materials for bonding the metal strips to the glass substrates as disclosed by Pub. Nos. US 2008/0166570 A1 and US 2009/0155499 A1 are elastic in nature. Therefore the bond and bond material are subject to all the forces within the metal strips themselves. Those forces will be a function of the modulus of elasticity of the metal and the strain. Given seals made of elastic materials or having elastic bonds, any relative lateral displacement of the glass sheets will result in stresses that persist as long as the displacement persists. Under load, elastic materials are subject to failure from tensile rupture, shear rupture, stain hardening, and bond failure between joined elastic materials. Bond and material failure is a general problem with any primarily elastic material or bond used for sealing the edges of VIG units.

United States Patent Application Publication No. US 2010/0178439 A1 discloses a flexible edge seal for vacuum insulating glazing units. The preferred embodiment discloses a flexible edge seal consisting of a thin metal with convolutes. The seal is shown as being exterior to the space between the glass sheets of a VIG unit. The surface area of the seal as disclosed is very much greater than the surface area defined by the gap between the glass sheets. Two of the factors affecting rate of gas permeation are the surface area and thickness of the material through which gas permeates. The greater the surface area and the thinner the material through which gas permeates the greater will be the rate of permeation. In this regard the seal as disclosed by Pub. No. US 2010/0178439 A1 is less than optimal. The design of this seal requires a space, and therefore surface area, greater than the confines between the glass sheets will allow. The thin metal is bonded to the glass sheets and is therefore subject to both bond and elastic material failure modes.

United States Patent Application Publication No. US 2010/0034996 A1 discloses a flexible edge seal for vacuum insulating glazing units very similar to and with the same shortcomings as that disclosed by Pub. No. U.S. 2010/0178439 A1.

SUMMARY OF THE INVENTION

Unless otherwise qualified, as it relates to this invention glass herein means any material that has a glass transition temperature and includes metallic, organic, and ceramic glasses, the latter including typical window glass such as soda-lime glass. Glass herein also means any glass as described above that may include other constituents in its composition such as but not limited to nanoparticles or nanotubes, which may improve or augment the physical characteristics of the glass or response of the glass to light. Glass herein also includes glass that may have active or passive devices imbedded wholly or partially within it.

Glass sheet herein includes laminated glass, such as, for example, glass sheets bonded together by a polymer. Glass sheet herein also includes any glass object that is preponderantly flat with substantially even thickness but which may also have raised or contoured areas in regions that may function to maintain a space and separation between the otherwise flat and even thickness regions of two glass sheets. Though not detailed herein, this invention contemplates that glass sheets with raised contours may be used in some embodiments. Glass sheet herein also includes any glass object that is preponderantly flat with substantially even thickness but which may also have recessed regions whose purpose may include containing a viscous material. A glass sheet herein may have coatings applied.

Viscous material herein means any material that flows like a liquid when a force is applied and includes both linear and nonlinear viscous materials, and Bingham plastics. A viscous material may include nanoparticles that may reduce permeability. Not included as a viscous material herein is any glass as defined above that is at a temperature below its glass transition temperature.

Various embodiments of this invention relate to VIG units that comprise two substantially parallel spaced apart glass sheets with a vacuum space in between and that have one or more edge seals that comprise a viscous material with low gas permeability. The viscous low gas permeability material bridges at least a portion of the gap between the glass sheets and surrounding the vacuum space so as to act as at least a partial seal for the vacuum. Because the gap is bridged by a viscous material that undergoes viscous shear with very low shear stress, when the glass sheets move relative to one another the stresses in the glass sheets resulting from those viscous shear stresses are insignificant and cannot contribute to fracture of the glass sheets or noticeable bulging of the glass sheets. Relative lateral movement of the glass sheets occurs during times of changing temperature difference between indoors and outdoors. Because the bridging material is viscous, when relative lateral movement of the glass sheets ceases so too does the shear stress. This is not the case for edge seals made entirely of elastic materials where static relative displacement results in sustained stress in the glass sheets.

Barriers to constrain the viscous material and methods to place it into assembly do not require heating the glass sheets above a temperature that would affect tempering of the glass sheets, or coatings on the glass sheets, or glass lamination. Because high temperatures are not needed for edge seal assembly, high temperature resistant spacers are not required, allowing selection of spacer composition from a broad range of materials that may have lower thermal conductivity and lower hardness that is less likely to scratch ceramic glass.

Given the nature of viscous fluid flow and the no slip condition, it is not possible for the viscous material to fail as a seal because of tensile rupture, shear rupture, fracture, low temperature brittle fracture, fatigue, material breakdown, delamination, separation, splitting, bond failure, adhesive failure, or strain hardening as might occur with materials that are primarily elastic in nature. As a result, VIG units that employ a viscous edge seal as disclosed herein will fail with far less frequency and with less potential damage and risk than VIG units that employ edge seals made entirely of materials that are primarily elastic.

A viscous material used in a viscous edge seal may be degassed or outgassed in a vacuum autoclave or by some other method. As examples, without limitation, methods to degass or outgass a viscous material may include creating a vacuum in contact with it, heating, stirring, sonication, and creating thin cascading flow. Without limitation any method to degass or outgass a viscous material may include any combination of the forgoing methods.

The interior of a vacuum autoclave or other vessel that contains a degassed or outgassed viscous material may be in communication through hermetically sealed connections such as tubing or fittings to a press or ram extruder, screw or screw extruder, rotary extruder, pump, or directly to a cavity in a VIG unit into which the viscous material is to flow. Alternatively a press or other mechanism to cause viscous flow may be an integral assembly within a vacuum autoclave. After the glass sheets of a VIG unit have been brought together, sandwiching all or some of the spacers in between, a cavity configured to contain a viscous material as part of a viscous edge seal may be evacuated to a pressure less than atmospheric pressure through a pump out hole or port or through multiple pump out holes or ports that may pass into the cavity and through any intervening material. As examples, and without limitation, intervening materials may include any or all of the following: a glass sheet of the VIG unit; any spacers, elements, or materials that may be a part of an edge seal; and or any materials forming part of a cavity that will contain viscous material that may not necessarily include a glass sheet or edge seal component. Degassed or outgassed viscous material may then be pressured into the evacuated cavity through a filler hole or port into the cavity or through multiple filler holes or ports that may pass into the cavity and through any intervening material. As examples, and without limitation, intervening materials may include any or all of the following: a glass sheet of the VIG unit; any spacers, elements, or materials that may be a part of an edge seal; and or any materials forming part of a cavity that will contain viscous material that may not necessarily include a glass sheet or edge seal component. The cavity may or may not remain under continual vacuum pumping to maintain a low pressure as the viscous material is pressured into it. Before or after the cavity is filled or partially filled with viscous material a vacuum pump or pumps and their connections may be released from the pump out port or ports and the port or ports may be sealed. Likewise the connections and fittings to a press, other device, or container that caused flow of the viscous material may be released and the filler port or ports may be sealed.

To pressure a viscous material into a cavity means to create total pressure or total head in that viscous material so that the viscous material flows into the cavity. That total pressure or total head may be created by any method. Those methods may include, without limitation, a press or press extruder, a pump, a screw or screw extruder, a rotary extruder, a ram extruder, or raising the viscous material higher than or to the height in the cavity to be occupied by viscous material.

As non-limiting examples a cavity may be any container, reservoir, or physically bounded region that is part of a VIG unit and that is configured to contain a viscous material or fluid. A cavity configured to contain a viscous material, where the viscous material may be part of an edge seal for a VIG unit, may be entirely between the glass sheets of a VIG unit, it may be entirely outside or not between the glass sheets or it may be partially in between and partially outside the glass sheets. A cavity may comprise multiple sub-cavities that are in open communication such that a viscous material entering any one of multiple sub-cavities may flow to one or more of the other sub-cavities. The sub-cavities from which the cavity configured to contain a viscous material is comprised may be, for example, connected in series and/or in parallel and/or may be contained within other sub-cavities. Viscous material may flow between connected sub-cavities or from one sub-cavity to another while a VIG unit is in service. A cavity may be open to the atmosphere such that a viscous material contained by it may be open to the atmosphere and therefore have an open free surface, in the same sense that a glass containing water has an open free surface. A cavity may comprise a material that floats on top of or that is otherwise in contact with a free surface of a viscous material contained by the cavity such that as the volume of the viscous material changes with thermal expansion and contraction, and rises and falls within the cavity, the material on top also rises and falls.

If a cavity as defined above contains a viscous material and any portion of that viscous material is included in an edge seal then all of the viscous material contained by that cavity is considered to be a part of the edge seal.

A cavity containing a viscous material as part of an edge seal may or may not have its entire volume occupied by that viscous material.

The volume of any cavity containing a viscous material may be variable and may change with thermal expansion and contraction of the materials of a VIG unit including the viscous material. Changing volume of a cavity containing a viscous material, though related to material expansion and contraction, may be the direct result of, without limitation: exuding of viscous materials between edge seal elements or components; and or movement, expansion and contraction, or inflation and contraction of rigid, flexible, or elastic membranes or components.

A cavity configured to contain a viscous material may or may not be evacuated to a pressure less than atmospheric pressure before viscous material is pressured into it. A cavity configured to contain a viscous material may be evacuated to a pressure less than atmospheric pressure and put through an outgassing bake-out before viscous material is pressured into it.

As part of a process that includes pressuring viscous material into a cavity configured to contain that viscous material, the main cavity between the glass sheets of a VIG unit that contains spacers and is meant to be viewed through may be evacuated to a pressure less than atmospheric before, during, or after viscous material is pressured into its cavity. Evacuating or pumping down the main cavity to a pressure less than atmospheric pressure before or while pressuring viscous material into its cavity may cause the glass sheets to resist separation as viscous material is pressured into its cavity.

A raw hole or port in a glass sheet through which gas, air, and viscous material may flow may have a ring or rings made of materials other than glass cemented into it to provide structural strength to the glass around the hole or port. Cement or adhesive may penetrate into a ground surface around a hole or port in a glass sheet forming a strong bond with a ring, which may be a metal, polymer, or composite. A ring may have features that allow quick hookup or installation of tubing or other fittings for, but not limited to, pumping, evacuating, pressuring, and sealing.

Polymers, because of their low thermal conductivities, are highly suitable materials from which spacers may be comprised, of which spacers may consist or of which spacers may consist essentially of. The use of polymers is made possible by the relatively low assembly temperatures afforded by viscous edge seals. Because the spacers may be disposed in the main vacuum space of a VIG unit in a portion of a VIG unit that is meant to be viewed through, the spacers may be composed of a polymer that is transparent to visible light. Good candidate polymers include, but are not limited to, polyimide, polyamide, polyetherimide, polycarbonate, and polybenzimidazole. Polymers used for spacers may have fillers that may include but are not limited to glass fibers, carbon fibers, or molybdenum disulfide. Molybdenum disulfide may reduce frictional forces while the carbon and glass fibers may impart enhanced tensile, compressive, and shear strength while also reducing creep. Other fillers may include carbon black or other additives that improve polymer resistance to oxidation or that reduce degradation caused by ultraviolet light or other light spectrums.

Polymer spacers may have molybdenum disulfide embedded in or deposited on a face that will contact one of the glass sheets to provide low friction.

Any use of the term polymer herein means a polymer that may include a filler or fillers. Any use of the term polymer herein means a polymer that may include a material or materials embedded in a surface or face of the polymer.

Polymers may be easily formed into various shapes for spacers that may be of particular advantage in limiting heat conduction while providing resistance to overturning moments caused by fictional forces between the glass sheets of a VIG unit. In basic embodiments, the spacers comprise two oppositely facing end faces connected by a spacer body. As an example, a cylindrical spacer may comprise two spacer segments, wherein one of the two segments has a larger diameter than the other of the two spacer segments. The larger diameter segment may form a stabilizing foot at one end of the spacer body. The smaller diameter segment may make up all or most of the remainder of the spacer body. The end face of the larger diameter segment may be adhered to one of the glass sheets of a VIG unit while the end face of the smaller diameter segment may be in contact with the other glass sheet without being adhered to it. The smaller diameter segment reduces heat conduction compared to that of the larger diameter segment while the larger diameter end face anchored to one of the glass sheets resists overturning moments created by friction caused by contact between the end face of the smaller diameter segment with the other glass sheet. The forgoing configuration allows spacer thickness to be increased without increasing spacer diameter or cross sectional area of the entire spacer in order to maintain spacer stability. Increasing spacer thickness decreases heat conduction. Having to increase spacer cross sectional area to maintain stability when increasing spacer thickness would negate reduction in heat conduction provided by thicker spacers. Increasing spacer thickness and consequently increasing gap distance between glass sheets of a VIG unit can increase the service life of a VIG unit by increasing the volume of the vacuum in between the glass sheets. Given no change in permeation rate as vacuum volume increases the pressure rise over time caused by permeation will be slower the larger the vacuum volume.

When a spacer is said to be in contact with a glass sheet it means that the spacer may contact the glass sheet directly or that it may contact a material that is in between the glass sheet and spacer. As examples, and without limitation, intermediate materials that may be in between a spacer and a glass sheet may include coatings, polymers, laminates, powders, lubricants, adhesives, contact sheets, and active or passive devices.

Instead of forming individual unconnected polymer spacers that must then be manipulated on some individual basis as part of a process to place them on a glass sheet of a VIG unit, compression and injection molding methods available for forming and producing polymer parts can automatically create integral polymer interconnections between polymer VIG support spacers that may eliminate the time that might otherwise be required to manipulate and place a large number of individual support spacers on a glass sheet. Interconnected spacers allow simultaneous handling, manipulation, and placing of spacers en masse as a set of pre-arrayed spacers.

Pre-arrayed spacers are spacers that are formed in a process or multiple processes that produce multiple spacers with interconnections between them that hold and maintain those spacers in the same array as they will have when first installed between the glass sheets of a VIG unit. An array herein means a spatial relationship that includes both geometry and distance. To say that a first and a second array of spacers is the same means that the first array can be superimposed on the second such that all the spacers of the first and second array will coincide. The geometry of an array need not be rectangular or square and may be of infinite variety. The geometry and distances between spacers in an array may vary and need not be regular or repeating.

Polymer pre-arrayed spacers are spacers that are pre-arrayed where the spacers and their interconnections comprise polymers.

For example, in some embodiments interconnected spacer arrays comprising, for example, at least 10, at least 1000, at least 1000 and at least 10,000 spacers may be employed. At some point in a process of assembly of interconnected spacers on a glass sheet of a VIG unit some or all interconnections may be removed. In some instances a jig may hold an initially interconnected array of spacers until the jig and a glass sheet are brought together, pressing the spacers to the face of the glass sheet where they may be adhered using a low outgassing adhesive that may be specified according to ASTM E595.

To remove an interconnection means to create a physical discontinuity between spacers where material continuity had existed. This may include, but is not limited to, removing an entire interconnection, breaking an interconnection but otherwise leaving the connecting material attached to at least one spacer, or removing a portion of an interconnection such that portions of the interconnection are still connected to one or more spacers.

Polymer spacers may be formed or created so as to be interconnected to each other as part of a forming process or multiple forming processes. Example forming processes, without limitation, may include injection and compression molding techniques. Interconnections may comprise the polymer itself so that thousands of spacers may be manipulated simultaneously by hand and or by automation until some or all of interconnections are removed either before or after or both before and after spacers are placed on a glass sheet. The interconnections may be in the form of a continuous unbroken sheet with no holes or discontinuities or there may be holes or discontinuities in the sheet of any size, shape, and or relationship so long as the spacers can be manipulated as a whole and their array essentially maintained until the interconnections are removed.

To place a spacer or spacers on a glass sheet means either to place them directly in contact with the glass sheet or in contact with an intermediate material that may be in between the spacers and the glass sheet. As non-limiting examples, intermediate materials may include coatings, laminations, polymers, powders, lubricants, adhesives, contact sheet, and active or passive devices. To adhere something to a glass sheet such as, but without limitation, a spacer, interconnection, or polymer sheet means that it may be adhered directly to the glass sheet or to an intermediate material that is in between it and the glass sheet. Any component of a VIG unit that is adhered to a glass sheet has the same definition of adhered as above.

A polymer sheet herein means any interconnection or interconnections between an array of VIG spacers that comprise a polymer or polymers and may have discontinuities in the form of holes of any size, shape, and or configuration and may have varying thickness and or perforations, and especially reduced thickness or indents or perforations where the sheet transitions to or becomes a spacer. A polymer sheet herein may be a mesh with filaments of any size, shape, and thickness. A single filament may have variable size, shape, and thickness.

As an example, a thin polymer sheet that is formed or created that integrally interconnects VIG polymer spacers may comprise spacers imbedded therein as an array of thicker regions of the thin polymer sheet. The polymer spacers, while still interconnected to one another by the thin polymer sheet formed at the same time and of the same polymer as the spacers, may be adhered to one of the glass sheets of a VIG unit after which the thin polymer sheet may be removed. Removal may be by, but not limited to, pulling, ripping, punching, or shearing. The thin polymer sheet may be removed around the circumference or periphery, or close to the circumference or periphery, of each polymer spacer leaving an array of individual and no longer interconnected polymer spacers adhered to the glass sheet. A thin polymer sheet comprising polymer spacers may be thinner and or have formed perforations at its interconnections or transitions to the imbedded or integral polymer spacers so as to reduce the force necessary to remove the polymer sheet from the polymer spacers.

In the preceding example polymer spacers are produced with polymer interconnections as part of a forming process and those interconnections hold the spacers in the same array they will have when first installed between the glass sheets of a VIG unit. Therefore in this example the spacers are polymer pre-arrayed spacers. This allows the spacers to be manipulated by hand or by automation en masse until it may be convenient to remove some or all of the interconnections.

In some instances it may be convenient to remove interconnections after spacers have been placed on a glass sheet as described in the example above and in still other cases it may be convenient to remove interconnections before they are placed on a glass sheet as in the case of a jig as described in the example below. In some cases at least some interconnections may be removed before spacers are placed on a glass sheet with still others being removed after the spacers are placed on the glass sheet.

An array of interconnected spacers may be formed. The interconnections may hold and maintain essentially the array that the spacers will have when first assembled in between the glass sheets of a VIG unit, which would make the spacers pre-arrayed spacers. An interconnected array of spacers may be placed in or on a jig that may hold and maintain spacer array independent of the existence of the interconnections created in the forming process. Likewise a jig may hold an interconnected array of spacers such that if some or all of the interconnections are removed some or all of the spacers may lose their placement in the array. An example where a jig may hold and maintain a spacer array independent of the interconnections is a plate with an array of holes that mirror an array of spacers. Interconnected spacers may be placed on the plate such that the spacers are held within the holes. If all the interconnections are removed, the spacer array will be maintained by all the spacers being held by the holes in the jig.

Spacers may be held with some resistance in or by a jig whether or not the spacers are held in holes as just described or held in proper relationship by a different method. Other methods of holding the spacers may include tacky substances or static electricity. Spacers may be held to a jig not directly but by connections between a polymer sheet and a jig. Resistance and fixity may be created by, but not limited to, a press fit in holes or other mechanical methods or by a light chemical bond, tack, or electrostatic charge. At this point in the process, while spacers are still held by a jig, interconnections may be removed by mechanical methods that may include, but are not limited to, ripping, tearing, shearing, punching, cutting, slicing, or grinding. Alternatively interconnections between spacers may be removed by methods that are not mechanical and that may include, but are not limited to, melting, chemical dissolving, or vaporization. The forgoing methods of interconnection removal may also be utilized if an interconnected array of spacers is first placed on a glass sheet of a VIG unit with or without the use of a jig. Any method of interconnection removal may be used alone or in combination with any number of other methods either simultaneously or in series or in any order or overlap of application.

Once interconnections have been removed, the jig, still holding the spacers in their original array, may place the spacers on a glass sheet by pressing the spacers to the glass sheet of a VIG unit. The spacers may protrude beyond the surface of the jig and the faces of the exposed spacers may be charged with a low outgassing adhesive so that when they are pressed to the glass sheet they adhere. After the jig has pressed the spacers to a glass sheet it may be pulled away from the glass sheet and the resistance to removal of the spacers from the jig is overcome and the spacers part from the jig and remain affixed to the glass sheet.

There may be instances where it may be advantages not to remove all interconnections between spacers while spacers are in or on a jig so that at least some of the interconnections may be removed while the spacers are still in or on a jig. A jig holding spacers may therefore press spacers to a glass sheet with some or all of the spacer interconnections remaining. Remaining interconnections may or may not be removed once spacers have been placed on a glass sheet using a jig. In some instances interconnections may not be removed while spacers are in or on a jig and some or none of the interconnections may be removed once spacers have been placed on a glass sheet.

A polymer sheet that interconnects polymer spacers may connect or transition to spacers at any point along the axis of a spacer as defined by a line constructed vertical and at right angles to the faces of the polymer sheet.

Instead of just a jig being used, a jig, die, and punch set may be used that punches spacers free from a polymer sheet, in other words removes the interconnections, before, during, or after placement on a glass sheet. Placement of spacers on a glass sheet may be initiated by the stroke of a punch that simultaneously breaks spacers free from a polymer sheet and presses spacers to a glass sheet.

In all of the methods and processes described thus far, intermediate materials may be used instead of a glass sheet. One example is to use a punch and die to separate spacers from a polymer sheet, in other words remove the interconnections, and to adhere the spacers to a sheet of an intermediate material that holds their array until the intermediate material is positioned over a glass sheet and the spacers attached to it are placed on the glass sheet where they may be adhered. An intermediate material may be flexible so as to more easily conform to any wave present on a glass sheet. A series of intermediate materials may be used in a series of processes that transfers spacers from one intermediate material to another before spacers are placed on a glass sheet of a VIG unit. In some instances an intermediate material may not be removed from an array of spacers and may itself be adhered to a glass sheet while still holding spacers. In these cases the intermediate material may remain between the assembled glass sheets of a VIG unit and become a permanent component.

Spacers may be placed on a glass sheet by simultaneously placing the equivalent of an entire simultaneously produced array of spacers on a glass sheet or by simultaneously or successively placing sections of simultaneously produced spacer arrays on a glass sheet or by simultaneously or successively placing the equivalent of multiple simultaneously produced spacer arrays including fractions thereof on a glass sheet. Spacers may be placed on a glass sheet by being pressed to a glass sheet by a roller that passes over a spacer array or arrays and or fractions thereof.

A simultaneously produced array of interconnected spacers may be smaller than a glass sheet. In these cases multiple arrays of interconnected spacers may be used in a process of placing spacers on a glass sheet. A simultaneously produced array of interconnected spacers may be cut or reduced to any size to accommodate any size glass sheet.

In some embodiments the polymer interconnections of a polymer sheet may comprise filaments running between spacers. In some embodiments it may be advantages not to remove these filaments or to remove only some of the filaments and to include all of them or those remaining in between the glass sheets of a fully assembled VIG unit.

In some embodiments the interconnecting polymer sheet may be clear or translucent, with or without a color tint, and continuous or nearly so. It may be advantages in these cases to adhere or place with no adherence or partial adherence the entire polymer sheet with integral spacers on a glass sheet without removal of any of the interconnections or with removal of only some of the interconnections.

Within all of the examples or contemplated embodiments of polymer sheets and polymer spacers and methods and processes for assembly and placement of spacers in VIG units, polymer spacers and or polymer sheets may be adhered, partially adhered, or not adhered to a glass sheet.

Active or passive devices, coatings, and chemicals may be attached to a polymer sheet or embedded in it and may include but are not limited to solar cells for the generation of electricity, chemicals and circuitry to produce and transmit current induced by solar radiation, photochromic material or chemicals, photochromic material or chemicals that react to electrical current, photochromic material or chemicals that selectively transmit, absorb, or reflect different wave lengths of electromagnetic radiation, and low emissivity or reflective coatings.

In all of the processes and arrangements described above for placing spacers on a glass sheet the glass sheet and spacers can be in any orientation. For example, and without limitation, instead of a sheet of polymer spacers being positioned over a glass sheet as part of the placement process, a glass sheet may be positioned over the spacers and the glass sheet lowered to the spacers or the spacers raised to the glass sheet or the glass sheet lowered while the spacers are raised.

A subset of polymer spacers interconnected by a polymer sheet may mean all of the interconnected spacers or two or more spacers up to the total number of interconnected spacers.

A spacer may migrate from its initial position after having been first placed on a glass sheet. Migration may be the result of forces between the spacer and glass sheets or between intermediate materials in between the spacer and glass sheets. This may be more likely to happen if a spacer is not adhered to either glass sheet or is part of a polymer sheet that floats between the glass sheets. The array that spacers may have when initially placed on a glass sheet may change over time. Without limitation this may be caused by a polymer sheet shrinking over time or changing dimensions caused by a bake-out procedure.

Spacers and polymer sheets may be outgassed before or after being placed on a glass sheet of a VIG unit. Without limitation, the outgassing may be done in a vacuum autoclave.

Some illustrative aspects and embodiments of the invention are summarized below.

One aspect of the invention provides a vacuum insulating glass unit comprising: a first glass sheet and a second glass sheet with a vacuum space in between at a pressure less than atmospheric pressure; at least one spacer in between the first and second glass sheets configured to contribute to the separation of the first and second glass sheets and the maintenance of the vacuum space; and an edge seal. The edge seal comprises: a viscous material, wherein the viscous material restricts the rate at which gas permeates into the vacuum space; the edge seal being configured to allow the first and second glass sheets to move laterally relative to one another when the first and second glass sheets experience differential thermal strain and further configured such that viscous shear occurs within at least a portion of the viscous material when there is relative lateral movement between the first and second glass sheets; and at least one barrier whose configuration constrains the viscous material. In some embodiments of this aspect of the invention, the viscous material is a Newtonian fluid, such as polyisobutene.

The barrier in the vacuum insulating glass unit may be a viscous barrier in contact with the viscous material. In some embodiments, at least one of the first and second glass sheets make up part of the barrier, while in other embodiments, the barrier does not include either of the first and the second glass sheets.

In one embodiment, the vacuum insulating glass unit includes a viscous material disposed in between the first and second glass sheets and the barrier comprises a first pair of strip spacers comprising a first strip spacer and a second strip spacer disposed between the first and second glass sheets on the vacuum space side of the viscous material, wherein the first strip spacer is affixed to the first glass sheet and the second strip spacer is affixed to the second glass sheet, and further wherein the first and second strip spacers are in contact and able to move laterally with respect to one another. The barrier further comprises a second pair of strip spacers comprising a third strip spacer and a fourth strip spacer disposed between the first and second glass sheets on the side of the viscous material opposite the vacuum space side, wherein the third strip spacer is affixed to the first glass sheet and the fourth strip spacer is affixed to the second glass sheet, and further wherein the third and fourth strip spacers are in contact and able to move laterally with respect to one another. This barrier also comprises a viscous barrier disposed in between the first pair of strip spacers and the viscous material and in between the second pair of strip spacers and the viscous material. Examples of vacuum insulating glass units in accordance with this embodiment are depicted in FIGS. 3-7, and are described in greater detail in the Detailed Description section, below.

In one variation of this embodiment of the invention, first and third strip spacers are joined by a strip of material extending in between the first and third strip spacers and in between the first glass sheet and the viscous material, and further wherein the second and fourth strip spacers are joined by a strip of material extending in between the third and fourth strip spacers and in between the second glass sheet and the viscous material.

In another embodiment, the first and second glass sheets each has an outer surface opposite the vacuum space and an inner surface facing the vacuum space and the edge seal includes an end cap having a first extension portion that extends over the outer surface of the first glass sheet and a second extension portion that extends over the outer surface of the second glass sheet, wherein the viscous material is disposed in between the outer surface of the first glass sheet and the first extension and in between the outer surface of the second glass sheet and the second extension. In this embodiment, the barrier includes a first strip spacer disposed in between the outer surface of the first glass sheet and the first extension on one side of the viscous material; a second strip spacer disposed in between the outer surface of the first glass sheet and the first extension on the other side of the viscous material; a third strip spacer disposed in between the outer surface of the second glass sheet and the second extension on one side of the viscous material; a fourth strip spacer disposed in between the outer surface of the second glass sheet and the second extension on the other side of the viscous material; and a viscous barrier disposed in between the first strip spacer and the viscous material, in between the second strip spacer and the viscous material, in between the third strip spacer and the viscous material, and in between the fourth strip spacer and the viscous material. An example of a vacuum insulating glass unit in accordance with this embodiment is depicted in FIG. 8, and is described in greater detail in the Detailed Description section, below.

In another embodiment, the edge seal includes: an end cap that forms an enclosure around the peripheral edges of the first and second glass sheets, wherein the viscous material fills the enclosure; and an elastic membrane that is affixed to and spans the gap separating the peripheral edges of the first and second glass sheets, wherein the elastic membrane is configured to constrain the viscous material. An example of a vacuum insulating glass unit in accordance with this embodiment is depicted in FIG. 9, and is described in greater detail in the Detailed Description section, below.

In another embodiment, the first and second glass sheets each has an outer surface facing opposite the vacuum space and an inner surface facing the vacuum space and the gap separating the first and second glass sheets tapers inward from the peripheral edge region of the first and second glass sheets. In this embodiment, the edge seal includes an end cap that forms an enclosure around the peripheral edges of the first and second glass sheets and the viscous material fills the enclosure and extends into the tapered gap separating the first and second glass sheets up to a point at which the surface tension at its leading edge prevents it from creeping further into the gap. An example of a vacuum insulating glass unit in accordance with this embodiment is depicted in FIG. 10, and is described in greater detail in the Detailed Description section, below.

Another aspect of the invention provides edge seals for vacuum insulating glass units. In one embodiment of this aspect of the invention, the edge seal comprises a first glass sheet and a second glass sheet with a vacuum space in between at a pressure less than atmospheric pressure. The edge seal in this embodiment comprises a viscous material, wherein the viscous material restricts the rate at which gas permeates into the vacuum; the edge seal being configured to allow the first and second glass sheets to move laterally relative to one another when the first and second glass sheets experience differential thermal strain and further configured such that viscous shear occurs within at least a portion of the viscous material when there is relative lateral movement between the first and second glass sheets; and at least one barrier whose configuration constrains the viscous material.

Another aspect of the invention provides methods for forming an edge seal for a vacuum insulating glass unit comprising a first glass sheet and a second glass sheet and at least one spacer in between the first and second glass sheets configured to contribute to the separation of the first and second glass sheets. In one embodiment, the method comprises sealing the edge of the vacuum insulating glass unit with an edge seal which, together with the first and second glass sheets, defines a vacuum space in between the first and second glass sheets; evacuating the vacuum space through a pump out port to a pressure less than atmospheric pressure; and sealing the pump out port. The edge seal in this embodiment being configured to allow relative lateral movement between the first and second glass sheets when the first and second glass sheets experience differential thermal strain and comprising: a viscous material, wherein the viscous material restricts the rate at which gas permeates into the vacuum space when it is at a pressure less than atmospheric pressure and further wherein there is viscous shear in at least a portion of the viscous material when there is relative lateral movement between the first and second glass sheets; and at least one barrier whose configuration constrains the viscous material. Sealing the edge of the vacuum insulating glass unit in this embodiment can be accomplished, for example, by pumping the viscous material in between the first and second glass sheets through one or more entry holes disposed along the periphery of at least one of the first and second glass sheets; directing, via a pressure differential, the viscous material to flow to one or more exit holes disposed along the periphery of at least one of the first and second glass sheets; and sealing the entry and exit holes. An example of a method of forming an edge seal in accordance with this embodiment is shown in FIGS. 13 and 14, and is described in greater detail in the Detailed Discussion section, below.

BRIEF DESCRIPTION OF THE DRAWINGS

The figures listed below relate to various embodiments of this invention or act as aids to reference those drawings.

FIG. 1 is not meant to represent a particular embodiment of this invention. FIG. 1 is a plan view of a generalized schematic depicting the basic elements of a VIG unit that is used to reference the location of the cross sectional drawings herein that do depict particular embodiments of this invention.

FIG. 2 is a sectional view of FIG. 1

FIG. 3 is a cross sectional view (as referenced by FIG. 1) of the edge region of a VIG unit according to a first embodiment of this invention under the condition that the ambient air temperatures on either side of the unit are the same, as would occur if the unit was in service in a building and the indoor and outdoor temperatures were the same.

FIG. 4 is a detail of a portion of the section shown in FIG. 3 but with greatly exaggerated scale in one area for clarity.

FIG. 5 is the same cross sectional view as FIG. 3 under the condition that the ambient air temperature on one side of the unit is lower than on the other, as would occur if the unit was in service and it was colder outdoors.

FIG. 13 is a schematic plan view of a VIG unit that diagrams a method of assembly for the edge seal depicted in FIG. 3 through FIG. 6.

FIG. 14 is a sectional view of FIG. 13.

FIG. 30 is a cross sectional view of a VIG unit with a cavity comprising multiple sub-cavities according to one embodiment of this invention.

FIG. 31 is a cross sectional view of a VIG unit with a cavity comprising multiple sub-cavities according to one embodiment of this invention.

FIG. 32 is a cross sectional view of a viscous edge seal for a VIG unit according to one embodiment of this invention.

FIG. 35 is a cross sectional view of a viscous edge seal for a VIG unit according to one embodiment of this invention.

FIG. 36 is a cross sectional view of a viscous edge seal for a VIG unit according to one embodiment of this invention.

DETAILED DESCRIPTION OF EXAMPLE EMBODIMENTS

Figure 6:
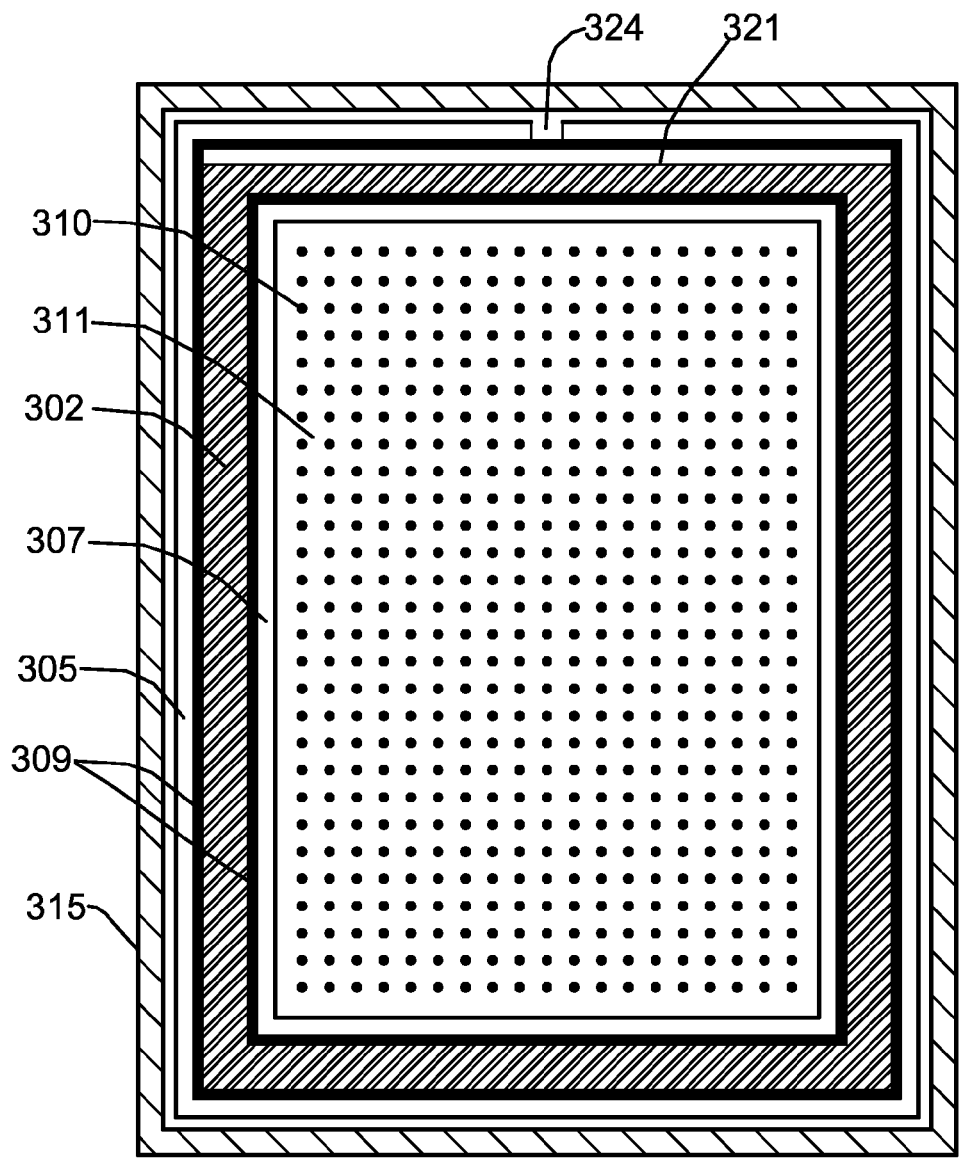
FIG. 6 is a sectional plan view of a VIG unit with an edge seal as depicted in FIG. 3.

FIG. 1 is a generalized schematic plan view depicting the basic elements of a VIG unit and is used to reference the location of the cross sectional drawings herein that depict particular embodiments of this invention. FIG. 2 is a cross section of FIG. 1. Referring to FIGS. 1 and 2, a VIG unit comprises two glass sheets 101 and 102 with a vacuum space 103 in between. The glass sheets are separated by spacers 104 which may be small discs made of PE Polyethylene. Although removal of any one spacer 104 will not necessarily result in the collapse of a portion of vacuum space 103, it can be said that every spacer 104 contributes to the separation of glass sheets 101 and 102 and therefore to the maintenance of the vacuum space 103 by resisting compression caused by atmospheric pressure. The vacuum space 103 is sealed around its perimeter by an edge seal 105.

An alternative to a multiple spacer arrangement may be a unitized or single spacer comprising a screen or mesh similar in form to insect screens but with larger grid spacing. The diameter or cross sectional dimensions of the filaments of such a screen spacer may vary so as to limit heat transmission surface area in contact with the glass sheets and so as to allow gas transmission between grid squares during pumping down of the vacuum space. A unit spacer may include perimeter strip elements with wider widths than the grid filaments. Carbon fiber may be one of many suitable materials for such a single unit screen spacer. A screen spacer may drastically reduce material and assembly costs and may be particularly well suited to take advantage of a viscous edge seal.

FIG. 3 is a cross sectional view (as referenced by FIG. 1) of the edge region of a VIG unit according to a first embodiment of this invention showing an edge seal that comprises viscous material 302 with low gas permeability and barriers that constrain viscous material 302 that include: glass sheets 303 and 304; strip spacers 305, 306, 307, 308; and lubricating low vapor pressure viscous barrier 309. Strip spacers 305, 306, 307, 308 may be made of 420 stainless steel, which has virtually the same coefficient of thermal expansion as soda lime glass, or they may be made of PE Polyethylene or other suitable polymers.

FIG. 3 shows the edge region under the condition that the ambient air temperatures on either side of the unit are the same, as would occur if the unit was in service in a building and the indoor and outdoor temperatures were the same. Glass sheets 303 and 304 are separated by an array of spacers 310. The thickness of spacers 310, and therefore the distance between glass sheets 303 and 304, may be approximately 0.02 inch. Spacers 310 may have a variety of shapes and be made of a variety of materials. The materials may be metallic, polymer, ceramic or composites of these materials. A preferred spacer 310 is a disk made of a polymer that will withstand the compressive forces placed on it, that has low thermal conductivity, and that will tend not to scratch glass sheets 303 and 304. Spacers 310 may be affixed to one of the glass sheets 303 or 304 so that they cannot migrate and yet allow relative lateral movement between glass sheets 303 and 304 with little resistance. In addition to being highly creep resistant, PE Polyethylene is self lubricating and may be a suitable material for spacers 310. The space 311 between glass sheets 303 and 304 is a vacuum at a pressure less than atmospheric pressure, preferably less than $10^{-4}$ torr. The low pressure vacuum space 311 essentially eliminates convective and conductive heat transfer through that space. Strip spacers 305 and 307 may be cemented or otherwise permanently affixed to glass sheet 303 and strip spacers 306 and 308 may be similarly affixed to glass sheet 304. Both strip spacers 305 and 306 are proximate the edges of glass sheets 303 and 304 and in between glass sheets 303 and 304. Strip spacers 305 and 306 may continue in this manner around both glass sheets 303 and 304. The thickness of strip spacers 305, 306, 307, and 308 may be the same and each equal to one half the distance between glass sheets 303 and 304. Therefore the combined thickness of spacers 305 and 306 may be equal to the distance between glass sheets 303 and 304 and the thickness of spacers 310. Strip spacers 307 and 308 are similar to strip spacers 305 and 306 except that they are situated further in from the edge of the glass sheets and there are no discontinuities as they continue around glass sheets 303 and 304. The distance between spacers 305 and 307 may be, for example, approximately two inches. For some applications where the rate of gas permeation through viscous material 302 must be kept especially low, as for example when long service life is sought without pumping down through a pump out port (not pictured) every couple of decades, the distance between strip spacers 305 and 307 may be ten inches or more. These regions of the edge where the seal is present could be buried within a wall cavity with insulation on either side. Strip spacers 305 and 307 may be one half inch wide and strip spacers 306 and 308 may be one quarter inch wide. Strip spacers 305 and 306 may contact each other in the sense that each exerts a reaction force against the other but they are not affixed to one another and are therefore free to move laterally relative to one another. Even though there may be an additional material or compound between strip spacers 305 and 306 they are still considered to be in contact. In the same sense strip spacers 307 and 308 may contact each other but are not affixed to one another and are therefore free to move laterally relative to one another. When glass sheets 303 and 304 are at the same temperature the center lines 312 of strip spacers 305 and 306 may closely coincide.

Still referring to FIG. 3, gases 313 at higher pressure than the pressure in vacuum space 311 may permeate through at least a portion of viscous material 302 at such a low rate as to provide a long service life for the vacuum insulating glass unit or at a rate that extends service life to anywhere from 10 to 20 years at which time the vacuum space 311 may be pumped down to its initial low vacuum pressure through a permanently attached or temporarily attachable pump out port (not pictured).

Still referring to FIG. 3, capping all of the edges of glass sheets 303 and 304 is an end cap 315 that may be pressed on and that surrounds the periphery of the VIG unit. In addition to shielding the edge gap 316, end cap 315 applies a clamping force against glass sheets 303 and 304 so as to maintain sufficient pressure on strip spacers 305 and 306.

Still referring to FIG. 3, viscous barrier 309 prevents viscous material 302 with low gas permeability from contacting spacers 305, 306, 307, and 308 where it could work its way between those spacers and increase frictional forces. The lubricating low vapor pressure viscous barrier 309 resists long term pressure induced creep between strip spacers 307 and 308 which are under tight contact with each other in excess of atmospheric pressure.

Let t be the thickness of a sheet of glass and let there be an arbitrary x and y Cartesian coordinate system in a plane substantially parallel to the faces of the glass sheet. In order to achieve a continuously tight gap free contact between strip spacers 307 and 308 and strip spacers 305 and 306 the gradient magnitude $|\nabla t|=|i\partial t/\partial x+j\partial t/\partial y|$ at any point around the periphery of glass sheets 303 and 304 should be sufficiently small such that any irregularities represented by $|\nabla t|$ will be pressed out through flexure caused by the compressive pressure of the atmosphere over the evacuated space 311 and by the clamping force of cap 315. Fortunately modern plate glass used for glazing is produced by the Pilkington float process. Le Bourhis (2008, p 35-36) states (references cited: other publications):

> The process was developed after the Second World War by Britain's Pilkington Brothers Ltd . . . . It was a revolution in flat glass production since polishing of the glass plates was no longer necessary . . . . In 1959, after seven years of experimentation and an investment of £7 million Pilkington Ltd introduced this economical means to produce distortion-free glass. Nowadays almost 90% of flat soda-lime-silica glass is exclusively produced in this way . . . .

The Pilkington float process automatically produces stock plate glass such that $|\nabla t|$ is sufficiently small to achieve the necessary tight continuous contact between strip spacers 305 and 306, and strip spacers 307 and 308. Thickness measurements of various specimens of plate glass from various sources using a digital micrometer reading to 0.00005 inch indicate that stock unaltered float glass will meet the necessary criteria for $|\nabla t|$.

Still referring to FIG. 3, a cavity is defined by the continuous region bounded by glass sheets 303 and 304 and by viscous barrier 309.

FIG. 4 is a detail of a portion of the section shown in FIG. 3 that greatly exaggerates the scale of the surface texture 317 of strip spacer 308 that is in contact with strip spacer 307. The surface texture 317 may be ground, satin, grooved, or some other category of roughness or combination of smoothness and roughness with very small amplitude 318. For example, the amplitude 318 may be on the order of 0.0004 inch. The net force on strip spacer 308 may be nine pounds per lineal inch of spacer. If the width of strip spacer 308 is one quarter inch this would result in a pressure on strip spacer 308 of 36 psi. Most of this pressure would be resisted through the high point contacts of the rough or grooved surface texture 317 of strip spacer 308 on strip spacer 307 and not by the thin film of viscous barrier 309 that will become partially interposed between strip spacers 307 and 308 due to relative lateral movement of glass sheets 303 and 304. Therefore the pressure of the thin film of viscous barrier 309 that will become partially interposed between strip spacers 307 and 308 will not exceed the pressure of viscous material 302. By limiting the pressure of the thin film of viscous barrier 309 between strip spacers 307 and 308 to that of viscous material 302 any tendency to "pump" viscous barrier 309 between spacers 307 and 308 and into vacuum space 311 is mitigated. The rough surface 317 increases the frictional forces on the thin film of viscous barrier 309 between spacers 307 and 308 and thereby increases the resistance of viscous barrier 309 to creep between spacers 307 and 308 and into evacuated space 311.

Ongoing rheological tests at three times atmospheric pressure have yet to reveal any sign of creep of a preferred material for viscous barrier 309 through a gap larger than that created by the rough surface of 317.

FIG. 5 is the same cross sectional view as FIG. 3 but under the condition that the ambient air temperature on one side of the unit is lower than on the other as would occur if the unit was in service and it was colder outdoors. When glass sheets 303 and 304 move laterally relative to one another 320 as a result of thermal strain or for any other service related reason, viscous material 302 undergoes viscous shear through a shear angle 319 with very little shear stress while maintaining adhesion to glass sheets 303 and 304 under the no-slip condition for viscous fluids. In this manner viscous material 302 cannot fail as a seal because of tensile rupture, adhesive failure, cold brittle fracture, material breakdown, strain hardening, delamination, fatigue, bond failure, shear rupture, puncture, or by inducing failure stresses in glass sheets 303 and 304. The low shear stress assures that glass sheets 303 and 304 will not bulge. Because the shear is viscous shear, where shear stress is a function of shear rate, once relative motion between glass sheets 303 and 304 stops there is no shear stress and of course no shear stress induced compressive or tensile stresses in glass sheets 303 and 304. This is not the case for elastic materials where stress persists after motion stops whether or not the strains are in the elastic or inelastic range. Therefore, given a viscous edge seal as disclosed by this embodiment, stresses in glass sheets 303 and 304 are not a function of static relative lateral displacement 320 between glass sheets 303 and 304. Therefore the size of a VIG unit with a viscous edge seal may be limited only by the practical size of producing glass sheets 303 and 304. This is not the case for the metal edge seals disclosed by Pub. Nos. US 2008/0166570 A1, US 2009/0155499 A1, US 2010/0178439 A1, and US 2010/0034996 A1, where the edge seals are subject to elastic and inelastic stress and strain and limited by strain at ultimate strength. An edge seal design that does not limit the size of a VIG unit is significant. Larger VIG units are more energy efficient because per square foot of window there can be less lineal footage of heat conducting edge seal.

Referring to FIG. 5, when lateral relative movement 320 occurs between glass sheets 303 and 304 as a result of thermal strain the space bounded by glass sheets 303 and 304 and spacers 305, 306, 307, and 308 does not change significantly and by geometric proof the volumes occupied by viscous barrier 309 do not significantly change. Therefore, given this type of relative movement, viscous barrier 309 redistributes to new shapes within the same volumes.

Changing indoor and outdoor temperatures will cause the components of a VIG unit to expand and contract differentially, including viscous material 302 and viscous barrier 309. As a result, the dimensions of the spaces that contain viscous material 302 and viscous barrier 309 will change. To accommodate this, viscous material 302 has a free surface 321 across the top of the unit as depicted in FIG. 6 that rises and falls as does the free surface of any fluid whose container changes dimensions. Also shown in FIG. 6 is a break 324 in strip spacer 305 to allow pressure equalization.

By way of illustration only, in some embodiments, the viscous material used in the edge seal will have a gas permeability of no greater than about 1,000,000 (centimeter$^3$·millimeter/meter$^2$·day·bar) for oxygen gas at 20° C., as measured by ASTM D 3985. This includes embodiments in which the viscous material has a gas permeability of no greater than about 100,000 (centimeter$^3$·mm/m$^2$·d·bar) for oxygen gas at 20° C., as measured by ASTM D 3985, and further includes embodiments in which the viscous material has a gas permeability of no greater than about 10,000 (centimeter$^3$·mm/m$^2$·d·bar) for oxygen gas at 20° C., as measured by ASTM D 3985, and further includes embodiments in which the viscous material has a gas permeability of no greater than about 1,000 (centimeter$^3$·mm/m$^2$·d·bar) for oxygen gas at 20° C., as measured by ASTM D 3985.

The desirable viscosity of the low permeability viscous material may vary over a wide range depending upon a variety of factors, including the method used to apply or dispose the viscous material in the edge seal. By way of illustration only, in some embodiments, the low permeability viscous material will have a viscosity of no greater than about 90,000,000 (mPa·s) at 20° C. This includes embodiments in which the low permeability viscous material has a viscosity of no greater than about 1,000,000 (mPa·s) at 20° C., further includes embodiments in which the low permeability viscous material has a viscosity of no greater than about 10,000 (mPa·s) at 20° C., still further includes embodiments in which the low permeability viscous material has a viscosity of no greater than about 1,000 (mPa·s) at 20° C., still further includes embodiments in which the low permeability viscous material has a viscosity of no greater than about 100 (mPa·s) at 20° C. and still further includes embodiments in which the low permeability viscous material has a viscosity of no greater than about 1 (mPa·s) at 20° C.

A viscous material with low gas permeability suitable for material 302 would be a cold flowing Newtonian fluid such as a low to medium molecular weight polyisobutene or PIB. The gas permeability of polyisobutene is one of the lowest for polymers and against which the permeability of other polymers is compared. In the form of elastic butyl rubber it lines all tires to prevent permeation of air out of the tires. PIB is inert, nontoxic, and stable indefinitely. Specifically, PIB manufactured by the chemical company BASF under the trade name Oppanol B10 has suitable viscosity. Other molecular weight grades of PIB may be suitable for this invention. For example, BASF makes a family of low molecular weight PIB's under the trade name Glissopal. Under some embodiments of this invention Glissopal or some formulation combining Glissopal and an Oppanol B may be an optimal choice for the viscous material 302 with low gas permeability. The choice may depend on the particular barrier or barriers used to segregate the PIB from the evacuated space 311 and or on the particular method used to place the PIB into assembly. Oppanol B10 has atmospheric gas permeability on the order of $10^{-10}$ cm$^3$·mm/(cm$^2$·sec·torr). This compares favorably with the gas permeability of metals $10^{-10}$ cm$^3$·mm/(cm$^2$·sec·torr), and of glasses $10^{-12}$ to $10^{-13}$ cm$^3$·mm/(cm$^2$·sec·torr).

Given the metal and solder glass edge seal thicknesses disclosed by the prior art, a two inch wide strip of viscous material 302 consisting of PIB would have a reduced rate of permeation compared to the metal seals and an increased rate of permeation relative to the solder glass seals of only a factor of ten. Given that the edge seal accounts for only 1/1000 to 1/5000 of the permeable surface of a vacuum insulating glass unit, any loss of service life of a VIG unit with a viscous PIB edge seal, compared to a unit with a solder glass edge seal, would be negligible. If a VIG unit has a permanently attached or temporarily attachable pump out port to which a vacuum pump can be attached in order to pump down the vacuum every couple of decades then the difference between the permeation rates of a solder glass edge seal and a two inch wide viscous edge seal composed of PIB is inconsequential.

Oppanol B10 is a Newtonian fluid. A Newtonian fluid is one where shear stress is proportional to shear rate. The constant of proportionality is defined as the material's viscosity. If Oppanol B10 were used for the embodiment shown in FIG. 3 with a gap of 0.02 inches between glass sheets 303 and 304, shear stresses caused by changing temperature differentials between inside and outside while the unit is in service would result in tensile and compressive forces in glass sheets 303 and 304 on the order of fractions of a pound force per lineal inch of glass edge.

Oppanol B10 exhibits cold flow. Unless confined, any force exerted on it will cause it to flow and keep flowing. For example, if a container of Oppanol B10 is tipped over without a lid its contents will slowly spill out. Like water it seeks its own level and exerts hydrostatic pressure. If an object with greater specific gravity is placed on the surface of Oppanol B10 it will slowly sink to the bottom. If the object's specific gravity is less than Oppanol B10 it will float on the surface.

The term "viscous barrier" is used to refer to a viscous material that may be used in an edge seal along with the low permeability viscous materials described above. This term is used for clarity to distinguish the two materials in those embodiments in which they are used together in an edge seal. By way of illustration only, in some embodiments, the viscous material of the viscous barrier will have a vapor pressure of no greater than about $10^{-5}$ torr. This includes embodiments in which the viscous material of the viscous barrier has a vapor pressure of no greater than about $10^{-6}$ torr, and further includes embodiments in which the viscous material of the viscous barrier has a vapor pressure of no greater than about $10^{-8}$ torr. A suitable material for viscous barrier 309 is the high temperature vacuum grease manufactured by M & I Materials Ltd under the trade name Apiezon H. Apiezon H is relatively stiff grease with a vapor pressure at 20 degrees Celsius of $1.7 \times 10$ torr. Apiezon H is inert and stable indefinitely. It will not melt and gets stiffer as its temperature increases. This particular characteristic is important because it will not soften if, for example, during VIG unit fabrication polyisobutene at an elevated temperature and lowered viscosity is pumped between glass sheets 303 and 304. Also of importance is the fact that the specific gravity of Apiezon H is virtually identical to that of polyisobutene.

Vacuum greases such as Apiezon H are primarily employed in vacuum sealing applications involving fixed o-ring or gasket seals or in rotary motion seals and where the vacuum space is under continual or short term intermittent pumping to maintain the vacuum at the desired level. They are also used in sealing ground glass stop cocks used in chemistry glassware. But here again the vacuums are maintained for short periods or are under continuous or short term intermittent pumping to maintain the vacuum. The importance of such greases has to do with their low vapor pressure and lubricating properties and with their ability to at least reduce gas leaking through the surface imperfections of o-rings and gaskets. Greases are generally not Newtonian fluids and under shear their shear stress is not proportional to the rate of shear but instead the relationship between shear stress and shear rate for greases takes more complicated nonlinear forms.

Use of vacuum greases in vacuum sealing applications does not suggest their use as a viscous material for edge sealing VIG units. To the contrary, the types of vacuum sealing applications where vacuum grease is employed suggest that it is not a viscous material suitable for restricting the permeation of gas through a VIG edge seal.

Figure 7:
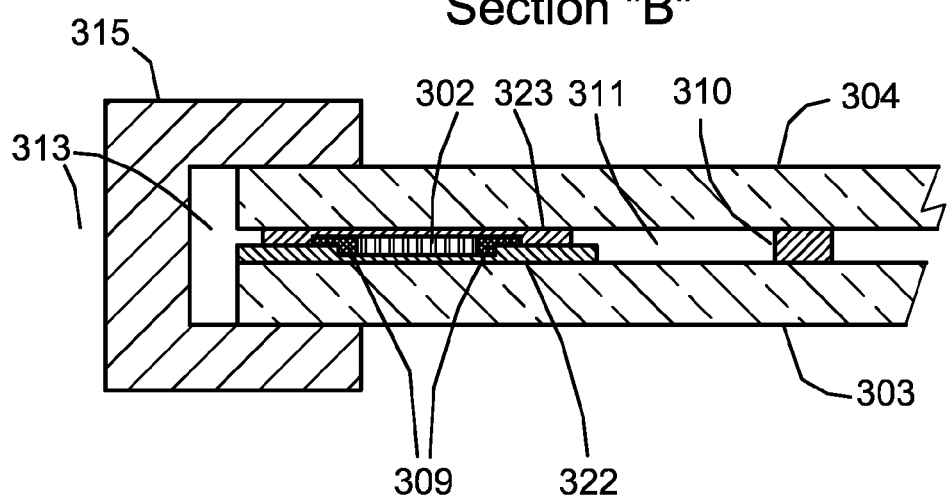
FIG. 7 is the same cross section as in FIG. 3 but with modification to more fully delineate the scope of the invention.

FIG. 7 is the same cross section as in FIG. 3 but with modification to more fully delineate the scope of the invention. The modification is that the strip spacers 305 and 307 are joined by a strip of the same material to become one strip spacer 322 and strip spacers 306 and 308 are similarly joined to become one strip spacer 323. Viscous low gas permeability material 302 is then no longer in contact with glass sheets 303 and 304. Unitizing strip spacers 305 and 307 and strip spacers 306 and 308 may speed VIG unit assembly times and reduce the area presented by viscous low gas permeability material 302 for gas to permeate through. A cavity is defined by the continuous region bounded by strip spacers 322 and 323 and viscous barrier 309.

Figure 8:
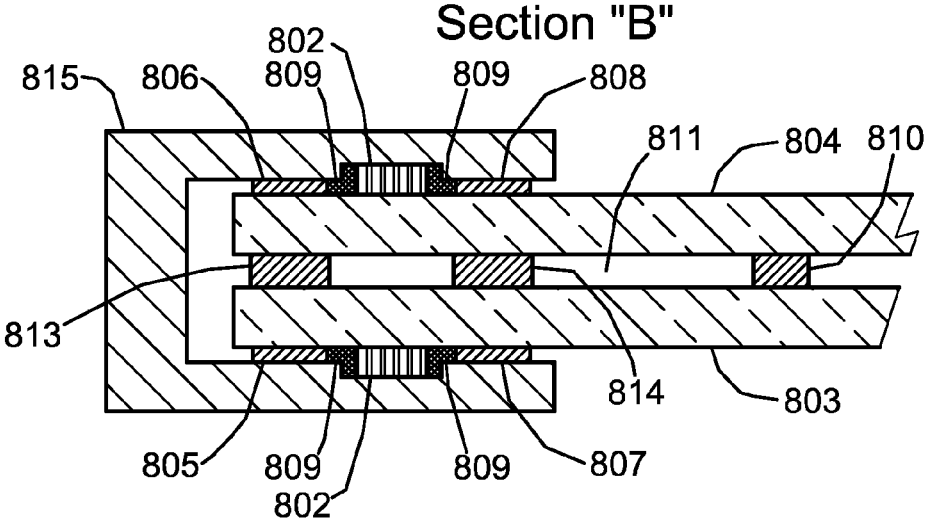
FIG. 8 is a cross sectional view (as referenced by FIG. 1) of the edge region of a VIG unit according to a second embodiment of this invention under the condition that the ambient air temperatures on either side of the unit are the same, as would occur if the unit was in service in a building and the indoor and outdoor temperatures were the same.

FIG. 8 is a cross sectional view (as referenced by FIG. 1) of the edge region of a VIG unit according to a second embodiment of this invention showing an edge seal that comprises viscous material 802 with low gas permeability and barriers to constrain viscous material 802 that include: glass sheets 803 and 804; strip spacers 805, 806, 807, and 808; lubricating low vapor pressure viscous barrier 809; and end cap 815. FIG. 8 shows the edge region under the condition that the ambient air temperatures on either side of the unit are the same, as would occur if the unit was in service in a building and the indoor and outdoor temperatures were the same. Viscous material 802 with low gas permeability and viscous barrier 809 may continue unbroken around the edge regions of glass sheets 803 and 804. Strip spacers 805, 806, 807, 808, and end cap 815 may continue unbroken around the edge regions of glass sheets 803 and 804. End cap 815 may place a clamping or compressive force against glass sheets 803 and 804. Glass sheets 803 and 804 are separated by an array of spacers 810 and by strip spacers 813 and 814. Strip spacers 813 and 814 may continue unbroken around the edge regions of glass sheets 803 and 804. The space 811 between glass sheets 803 and 804 is a vacuum at a pressure less than atmospheric, preferably less than $10^{-4}$ torr. The low pressure vacuum space 811 greatly reduces convective and conductive heat transfer between glass sheets 803 and 804. Strip spacers 805 and 807 may be cemented to glass sheet 803 and strip spacers 806 and 808 may be cemented to glass sheet 804. End cap 815 is free to move relative to spacers 805, 806, 807, and 708. When there is relative lateral movement between glass sheets 803 and 804 some portion of viscous material 802 will undergo viscous shear. A first cavity is defined by the continuous region bounded by viscous barrier 809, glass sheet 804, and end cap 815. A second cavity is defined by the continuous region bounded by viscous barrier 809, glass sheet 803, and end cap 815.

Figure 9:
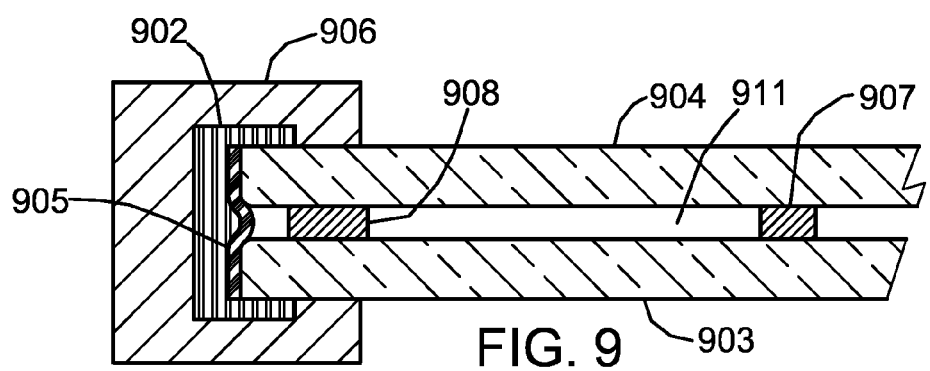
FIG. 9 is a cross sectional view (as referenced by FIG. 1) of the edge region of a VIG unit according to a third embodiment of this invention under the condition that the ambient air temperatures on either side of the unit are the same, as would occur if the unit was in service in a building and the indoor and outdoor temperatures were the same.

FIG. 9 is a cross sectional view (as referenced by FIG. 1) of the edge region of a VIG unit according to a third embodiment of this invention showing an edge seal that comprises viscous material 902 with low gas permeability and barriers to constrain viscous material 902 that include: glass sheets 903 and 904, elastic membrane 905, and end cap 906. Elastic membrane 905 is cemented or otherwise affixed to glass sheets 903 and 904. Elastic membrane 905 need not have low gas permeability so it can be made of a material and with a thickness that stretches easily and with very little force. FIG. 9 shows the edge region under the condition that the ambient air temperatures on either side of the unit are the same as would occur if the unit was in service in a building and the indoor and outdoor temperatures were the same. Glass sheets 903 and 904 are separated by an array of spacers 907 and by strip spacer 908. Viscous material 902, elastic membrane 905, end cap 906 and strip spacer 908 may continue unbroken around the edge regions of glass sheets 903 and 904. The space 911 between glass sheets 903 and 904 is a vacuum at a pressure less than atmospheric, preferably less than $10^{-4}$ torr. The low pressure vacuum space 911 greatly reduces convective and conductive heat transfer between glass sheets 903 and 904. End cap 906 may place a clamping or compressive force against glass sheets 903 and 904. End cap 906 is not affixed to glass sheets 903 and 904 and is free to move relative to glass sheets 903 and 904. When there is relative lateral movement between glass sheets 903 and 904 some portion of viscous material 902 will undergo viscous shear. A cavity is defined by the continuous region bounded by end cap 906, elastic membrane 905, and glass sheets 903 and 904.

Figure 10:
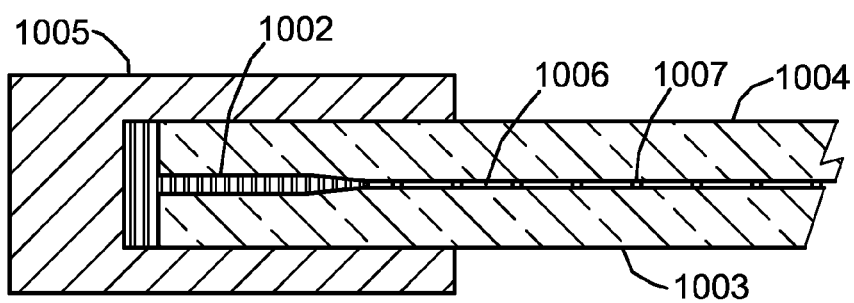
FIG. 10 is a cross sectional view (as referenced by FIG. 1) of the edge region of a VIG unit according to a fourth embodiment of this invention under the condition that the ambient air temperatures on either side of the unit are the same, as would occur if the unit was in service in a building and the indoor and outdoor temperatures were the same.

FIG. 10 is a cross sectional view (as referenced by FIG. 1) of the edge region of a VIG unit according to a fourth embodiment of this invention showing an edge seal that comprises viscous material 1002 with low gas permeability and barriers to constrain viscous material 1002 that include: glass sheets 1003, 1004, and end cap 1005. Viscous material with low gas permeability 1002 and end cap 1005 may continue unbroken around the edge regions of glass sheets 1003 and 1004. The space 1006 between glass sheets 1003 and 1004 is a vacuum at a pressure less than atmospheric pressure, preferably less than $10^{-4}$ torr. The low pressure vacuum space 1006 greatly reduces convective and conductive heat transfer between glass sheets 1003 and 1004. Maintaining separation between glass sheets 1003 and 1004 are micro sized spacers 1007 that may be made of, for example, nanoparticles or nanotubes. Viscous material 1002 is prevented from creeping into space 1006 by surface tension at the leading edge of material 1002 that is bounded by vacuum space 1006. This is made possible by the extremely close spacing of glass sheets 1003 and 1004. When there is relative lateral movement between glass sheets 1003 and 1004 some portion of viscous material 1002 will undergo viscous shear. A cavity is defined be the continuous region bounded be end cap 1005 and glass sheets 1003 and 1004.

Figures 11, 12:
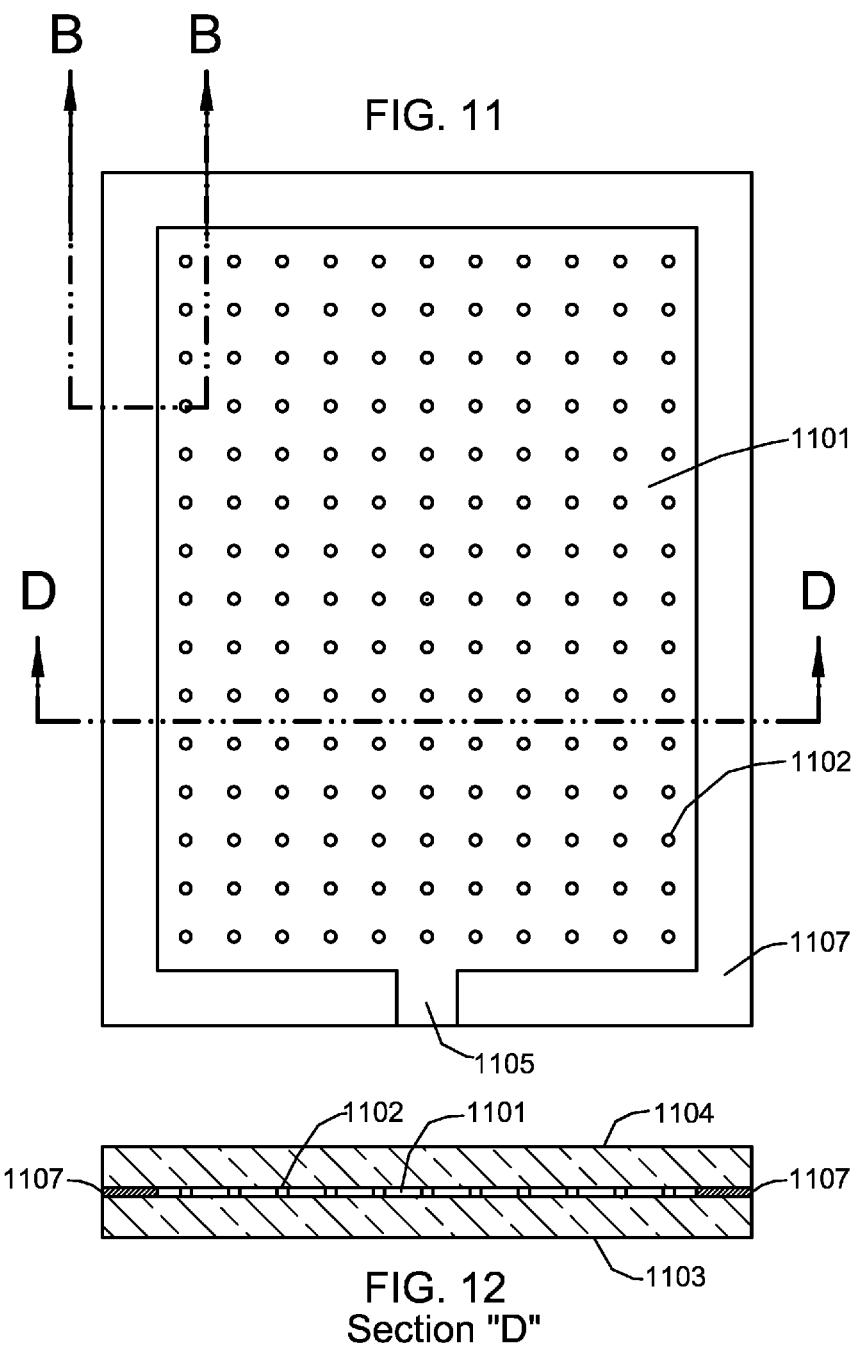
FIG. 11 shows a schematic plan view of a VIG unit indicating that the edge seals disclosed herein need not run continuously around the edges of a VIG unit and that they may be discontinuous.
FIG. 12 is a sectional view of FIG. 11.

FIG. 11 shows a schematic plan view of a VIG unit with a vacuum 1101 and an array of spacers 1102 between glass sheets 1103 and 1104 as depicted in FIG. 12, which is a sectional view of FIG. 11. Glass sheets 1103 and 1104 are rigidly joined to one another at 1105. Edge seal 1107 may be any of the first through fourth embodiments disclosed herein. Glass sheets 1103 and 1104 are free to expand and contract independently of one another yet remain fixed at point 1105. The rigid contact point 1105 prevents glass sheets 1103 and 1104 from "walking" their way out of registration with one another as a result of repeated cycles of expansion and contraction of glass sheets 1103 and 1104. The embodiment of a VIG unit as disclosed by FIG. 11 underscores that the viscous edge seals as disclosed herein need not be continuous and without break.

FIG. 13 is a schematic plan view of a VIG unit that diagrams a process suitable for the first embodiment, herein depicted in FIG. 3 through FIG. 6, for placing a viscous low gas permeability material 1306 into assembly between glass sheets 1301 and 1302. FIG. 14 is a section of FIG. 13. Glass sheets 1301 and 1302 have a vacuum 1303 in between them and are separated by an array of spacers 1304. The assembly process is as follows: first, glass sheets 1301 and 1302 are placed together so as to sandwich all of the spacers between them; second, edge caps, 315 in FIG. 3, are pressed onto the edges; third, viscous low gas permeability material 1306 is pumped through holes 1307 in glass sheet 1302 while maintaining lower pressures at holes 1308; fourth, viscous material 1306 flows 1309 toward holes 1308; fifth, after the viscous material has been placed, holes 1307 and 1308 are sealed with caps.

Still referring to FIGS. 13 and 14, one assembly process is as follows: first, glass sheets 1301 and 1302 are placed together so as to sandwich some or all of the spacers between them; second, the central cavity containing the support spacers is evacuated to a pressure less than atmospheric; third, the cavity to be filled with a viscous material in evacuated to a pressure less than atmospheric; fourth, viscous low gas permeability material 1306, which has been degassed and or outgassed in a vacuum autoclave or by other methods, is pressed through holes 1307 in glass sheet 1302 while maintaining vacuum pumping at holes 1308; fifth, viscous material 1306 flows 1309 toward holes 1308; sixth, after the viscous material has been placed, holes 1307 and 1308 are sealed with caps.

Figure 15:
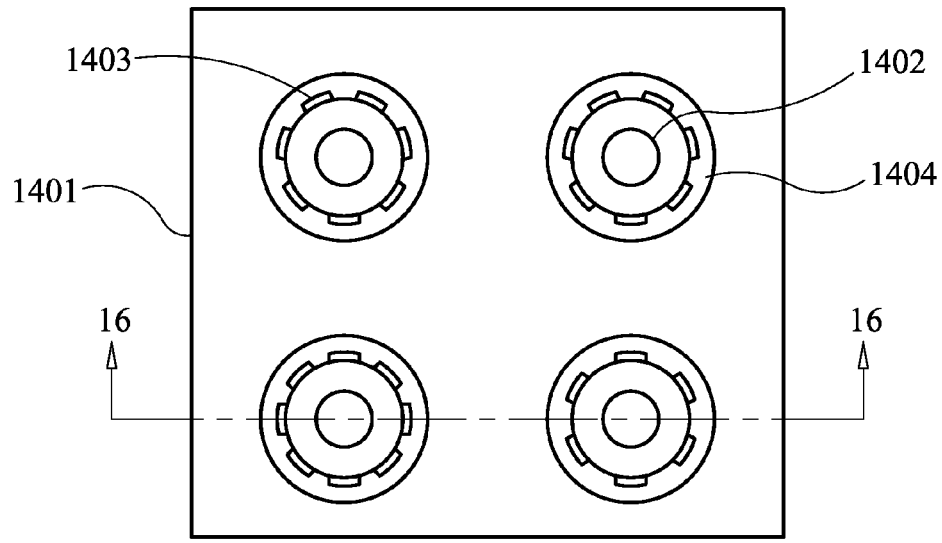
FIG. 15 is a plan view of a polymer sheet that interconnects an array of polymer spacers according to one embodiment of this invention.
Figure 16:
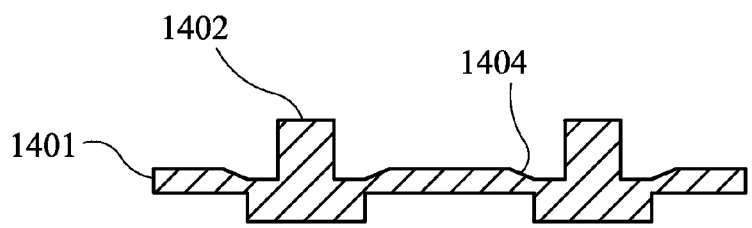
FIG. 16 is a cross sectional view of FIG. 15.
Figure 17:
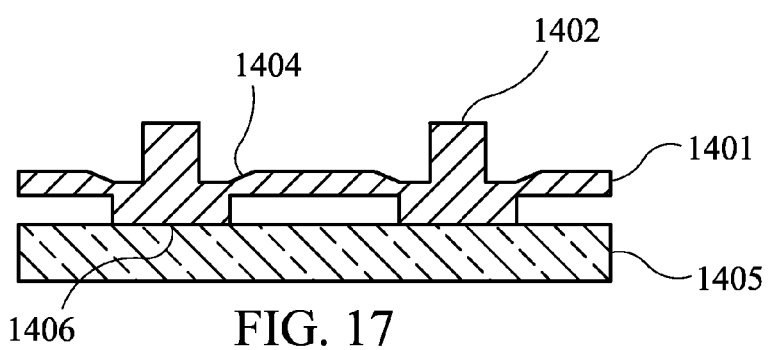
FIG. 17 is the cross sectional view of the polymer sheet in FIG. 16 placed on a glass sheet according to one embodiment of this invention.
Figure 18:
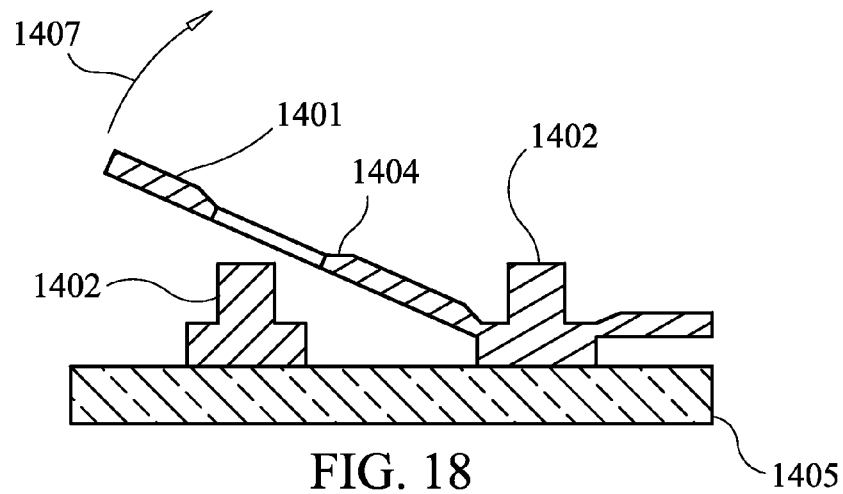
FIG. 18 is the cross sectional view of FIG. 17 showing how a polymer sheet may be removed from integrally formed polymer spacers according to one embodiment of this invention.

FIG. 15 depicts a plan view of a polymer sheet 1401 with integrally formed polymer spacers 1402 according to one embodiment of this invention. Polymer sheet 1401 may be formed simultaneously with polymer spacers 1402 by injection molding or compression molding techniques. Perforations 1403 may be formed in the same process and may represent discontinuities in polymer sheet 1401. Regions 1404 where polymer sheet 1401 connects to or transitions to polymer spacers 1402 may be thinner than other regions of polymer sheet 1401. FIG. 16 is a cross sectional view of FIG. 15 and reveals that regions 1404 where polymer sheet 1401 connects to or transitions to polymer spacers 1402 may be thinner than other regions of polymer sheet 1401. FIG. 17 is a cross sectional view depicting polymer sheet 1401 with polymer spacers 1402 placed such that polymer spacers 1402 may be in contact with glass sheet 1405. Prior to polymer spacers 1402 being placed on glass sheet 1405, end faces 1406 of polymer spacers 1402 that may contact glass sheet 1405 may be charged with an adhesive that may be low outgassing. According to one embodiment of this invention FIG. 18 depicts how polymer sheet 1401 may be removed from polymer spacers 1402 by pulling 1407 on polymer sheet 1401, leaving polymer spacers 1402 adhered to glass sheet 1405. Removal of polymer sheet 1401 from polymer spacers 1402 may be aided by thinner regions 1404 and by perforations 1403 depicted in FIGS. 15 and 16.

Figure 19:
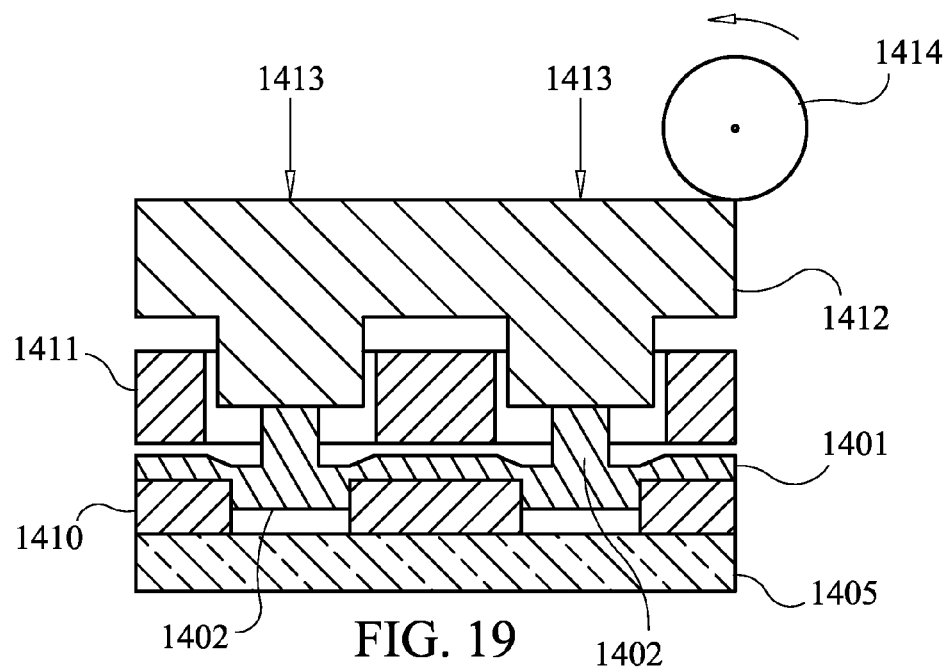
FIG. 19 is a cross sectional view of a polymer sheet that interconnects an array of polymer spacers in a punch and die used to remove the polymer sheet from the spacers and press them to a glass sheet according to one embodiment of this invention.

FIG. 19 depicts a sectional view of a polymer sheet 1401 that interconnects an array of polymer spacers 1402 that may have been formed by compression and or injection molding techniques. Polymer sheet 1401 and polymer spacers 1402 may be set in a die 1410 that may contact glass sheet 1405. Another die or jig 1411 may sit on top of polymer sheet 1401. Punch plate 1412 may drive down 1413 on polymer spacers 1402, removing polymer sheet 1401, and pressing polymer spacers to glass sheet 1405 where they may or may not be adhered to glass sheet 1405 by an adhesive that may or may not be low outgassing. Punch plate 1412 may contact die or jig 1411 in its stroke cycle pressing polymer sheet 1401 to die 1410 in order to obtain a clean break between spacers 1402 and polymer sheet 1401. Punch plate 1412 may be or comprise a flexible material such as but not limited to rubber. A roller 1414 may pass over punch plate 1412 successively pressing rows of polymer spacers 1402 to glass sheet 1405 and removing polymer sheet 1401.

Figure 20:
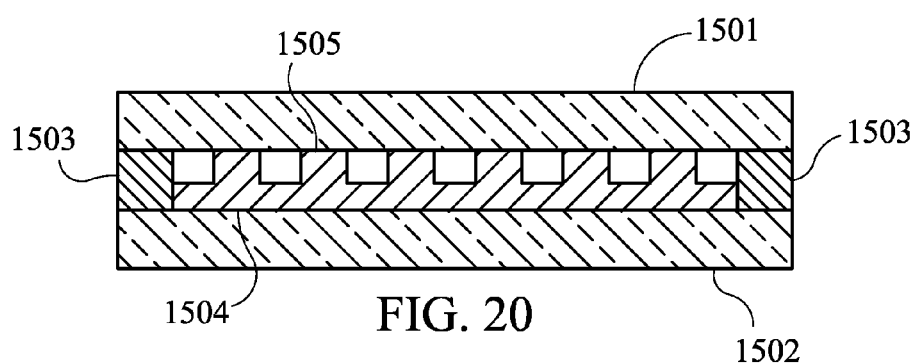
FIG. 20 is a cross sectional view of a vacuum insulating glass unit with viscous edge seal showing a polymer sheet with polymer spacers where the sheet is essentially continuous and not removed from the spacers in the final VIG assembly according to one embodiment of this invention.

FIG. 20 shows a VIG unit with glass sheets 1501 and 1502 and viscous edge seal 1503. Polymer sheet 1504 may be totally adhered, partially adhered, or not adhered at all to glass sheet 1502. Support spacers 1505 are interconnected by essentially continuous polymer sheet 1504. Polymer sheet 1504 and spacers 1505 may be formed integrally connected and simultaneously in the same compression or injection molding process.

Figure 21:
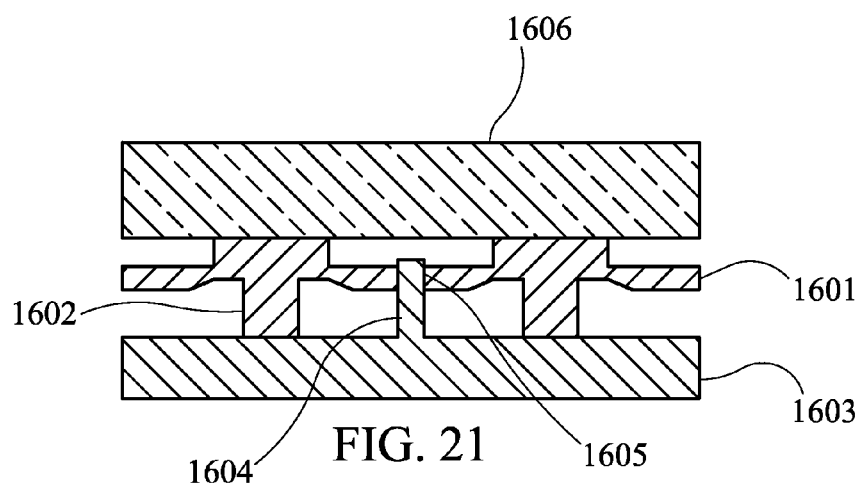
FIG. 21 is a cross sectional view of a polymer sheet with integral spacers positioned by a jig with a glass sheet lowered onto the polymer spacers according to one embodiment of this invention.

FIG. 21 is a cross sectional view of a polymer sheet 1601 with integral polymer spacers 1602 positioned by a jig 1603, which has pins 1604 that pass through holes 1605 in polymer sheet 1601. Glass sheet 1606 may be lowered onto polymer spacers 1602, which may or may not be adhered to glass sheet 1606.

Figure 22:
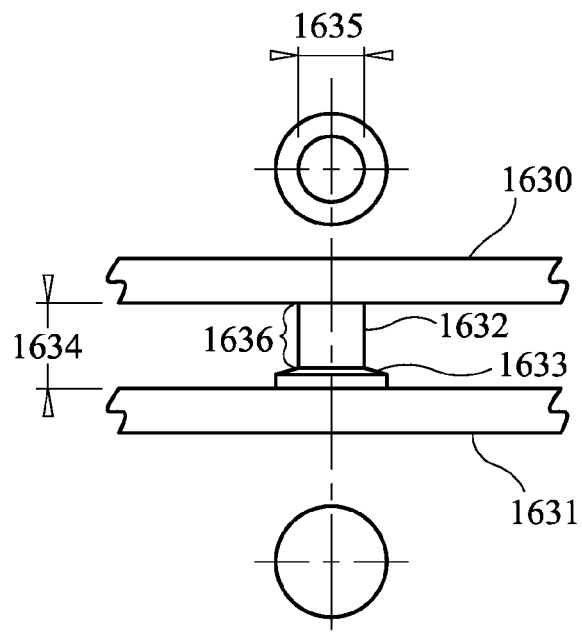
FIG. 22 depicts a support spacer for a VIG unit with a shape to minimize heat conduction and provide for stability according to one embodiment of this invention.

FIG. 22 depicts a detail of a support spacer 1632 with a flange 1633. Flange 1633 allows thickness 1634 of spacer 1632 to be increased by increasing stability against overturning. Overturning moment is generated by frictional forces between spacer 1632 and glass sheets 1630 and 1631 when glass sheets 1630 and 1631 move laterally relative to one another because of differential thermal strain. Flange 1633 allows remainder of spacer body, segment 1636, to have a smaller diameter 1635. The smaller diameter 1635 and greater thickness 1634 minimize heat conduction through spacer 1632. Spacer 1632 may be cemented or otherwise adhered to glass sheet 1631.

Figure 23:
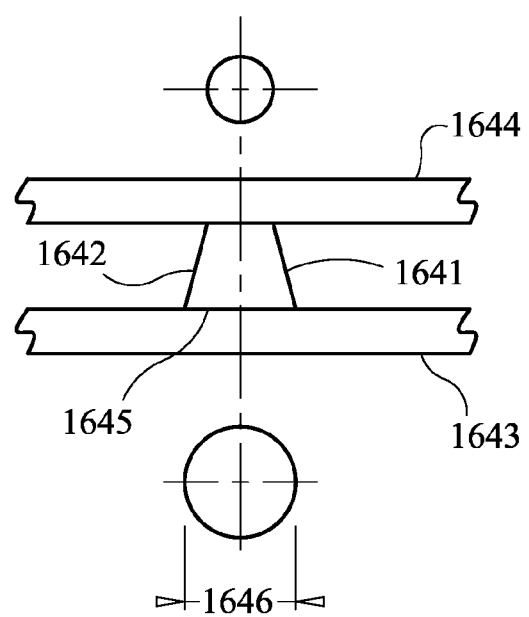
FIG. 23 depicts a support spacer for a VIG unit with a shape to minimize heat conduction and provide for stability according to one embodiment of this invention.

FIG. 23 depicts a detail of a support spacer 1641 with a tapered side 1642 between glass sheets 1643 and 1644. Tapered side 1642 provides a wider base 1645 to resist an overturning moment while providing for less heat loss through spacer 1641 than would occur if spacer 1641 was cylindrical with a diameter 1646.

Figure 24:
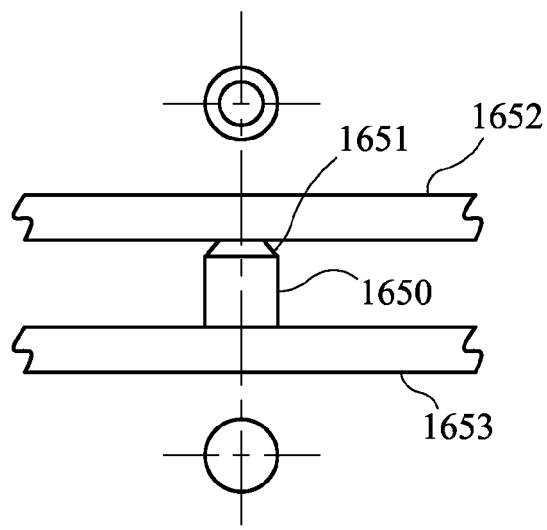
FIG. 24 depicts a support spacer for a VIG unit with a shape to minimize heat conduction and provide for stability according to one embodiment of this invention.

FIG. 24 depicts a detail of a support spacer 1650 with a beveled edge 1651. Beveled edge 1651 reduces the area of spacer 1650 in contact with glass sheet 1652, which reduces heat loss through spacer 1650. Beveled edge 1651 also reduces the likelihood of spacer 1650 being chipped when glass sheet 1652 moves relative to it. Spacer 1650 may or may not be cemented or adhered to or otherwise affixed to glass sheet 1653.

Figure 25:
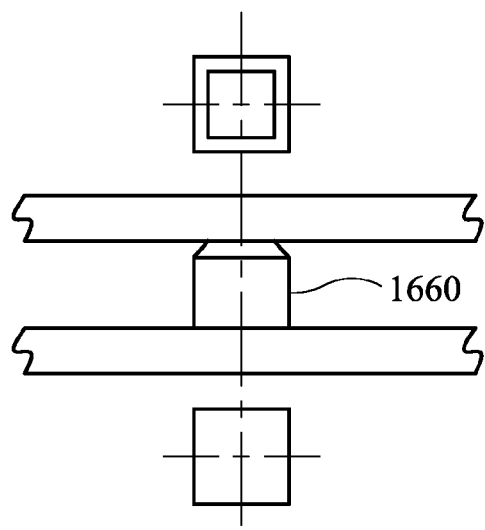
FIG. 25 depicts a support spacer for a VIG unit with a shape to minimize heat conduction and provide for stability according to one embodiment of this invention.

FIG. 25 depicts a detail of a support spacer 1660 that has a square cross section to emphasize that cross sectional geometry of spacers may have varied shapes and still possess the attributes of reduced heat conduction and stability disclosed by FIGS. 22 through 24.

Figure 26:
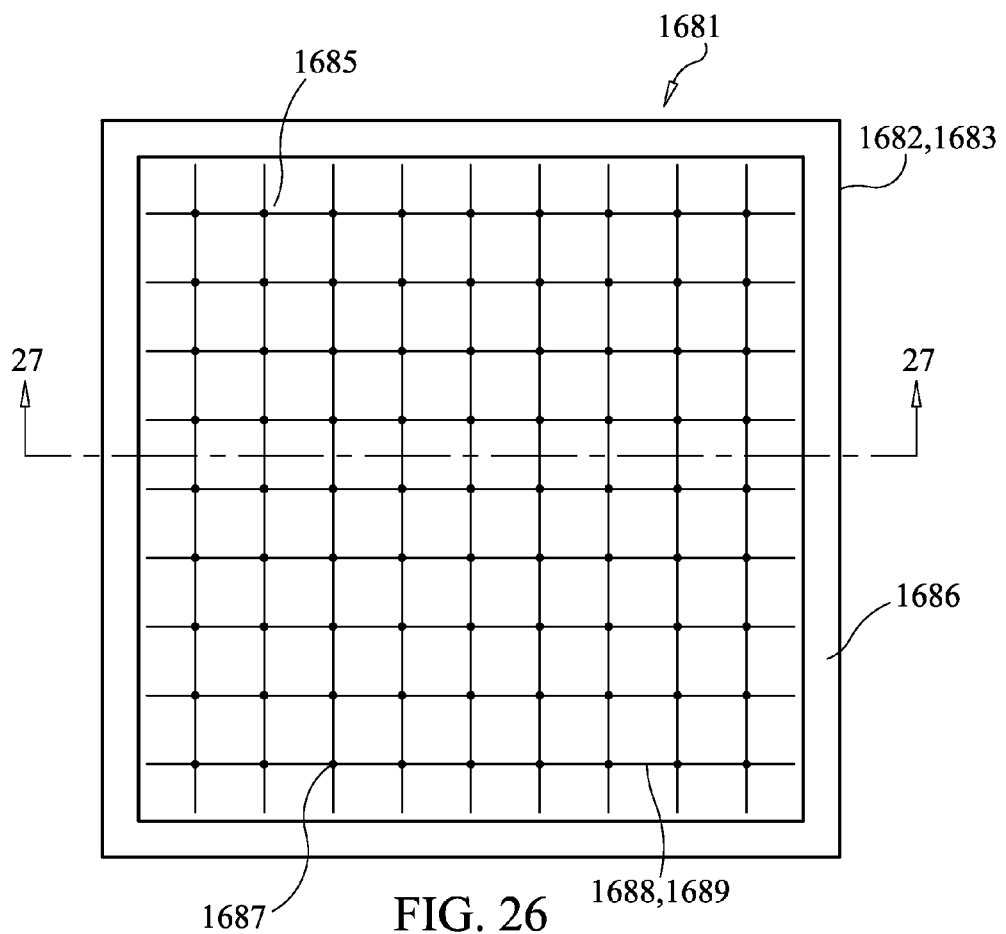
FIG. 26 depicts a plan view of a VIG unit with a mesh support spacer according to one embodiment of this invention.
Figure 27:
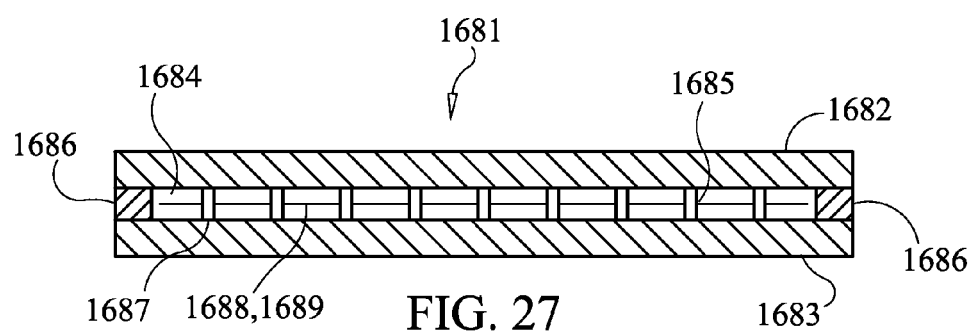
FIG. 27 is a cross sectional view of FIG. 26.

Referring to FIGS. 26 and 27, a VIG unit 1681 comprises two glass sheets 1682 and 1683 separated by a vacuum gap 1684 at a pressure less than atmospheric pressure. A mesh support spacer 1685 in between sheets 1682 and 1683 maintains vacuum gap 1684 by resisting the compressive load of atmospheric pressure. Mesh support spacer 1685 may be fixed and immovable with respect to either glass sheet 1682 or 1683 or may float between sheets 1682 and 1683. A low gas permeability edge seal 1686 around the periphery of VIG unit 1681 separates the atmosphere from vacuum gap 1684.

Still referring to FIGS. 26 and 27, mesh support spacer 1685 comprises support spacers 1687 that are interconnected by a mesh 1688. Support spacers 1687 resist the compressive load of atmospheric pressure. Mesh 1688 allows easy and rapid assembly of VIG unit 1681. Mesh 1688 may be less thick than spacers 1687 in a direction perpendicular to glass sheets 1682 and 1683. Support spacers 1687 and mesh 1688 may include any suitable materials. In some embodiments spacers 1687 and mesh 1688 are made of a polymer. A suitable polymer is polyimide. In some embodiments spacers 1687 and mesh 1688 may be formed at the same time and as a unit as in a compression molding process. Spacers 1687 may be of any suitable size or shape. Mesh filaments 1689 may be of any length or cross section. In some embodiments the cross sections of filaments 1689 may vary in size and shape.

Figure 28:
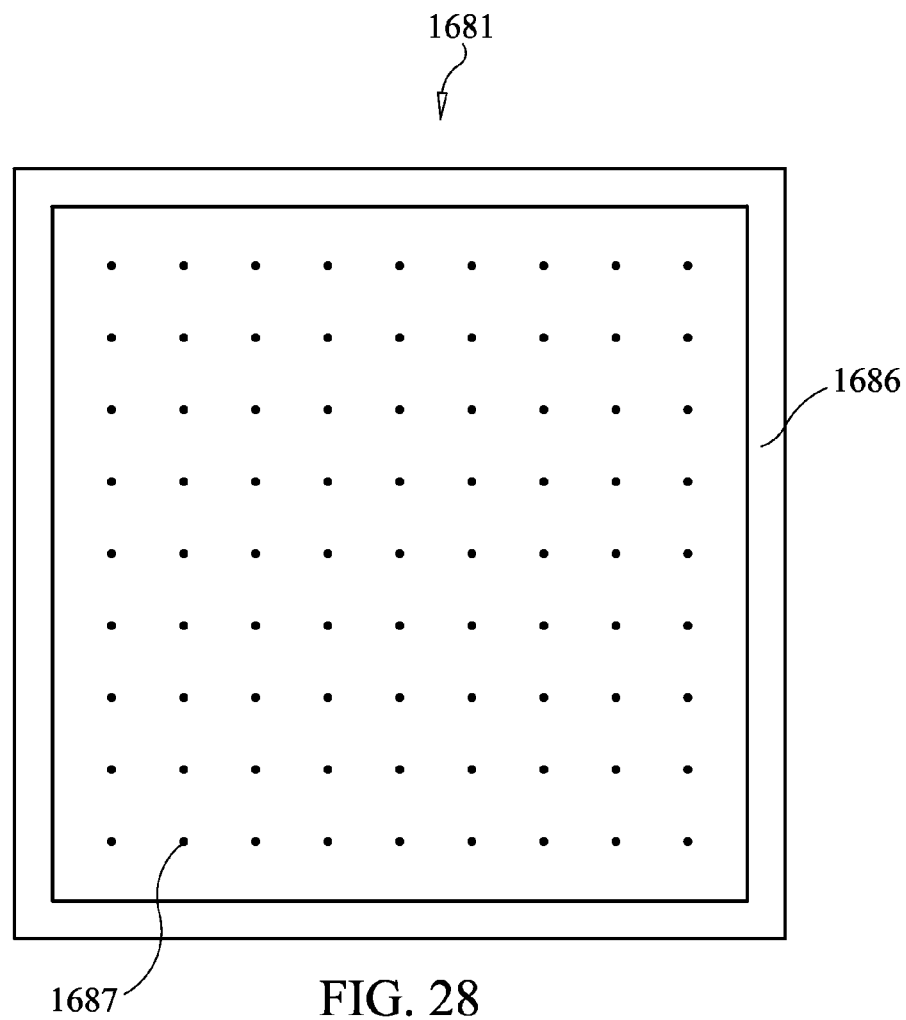
FIG. 28 depicts a plan view of a VIG unit with mesh removed during window assembly according to one embodiment of this invention.

Referring to FIGS. 27 and 28, in some embodiments mesh filaments 1689 are removed wholly or in part during assembly of VIG unit 1681. FIG. 28 shows a VIG unit 1681 with mesh filaments 1689 removed during assembly. Mesh 1688 aids in assembly of VIG unit 1681 because it allows many spacers 1687 to be simultaneously placed as a matt on glass sheets 1682 and or 1683. After a mesh support spacer 1685 is positioned on glass sheet 1682 and or 1683, mesh filaments 1689 may be quickly removed by cutting or by other methods, leaving spacers 1687 on one or both of glass sheets 1682 and 1683. Spacers 1687 may be affixed to one of the glass sheets 1682 or 1683 or float between them. Some of the spacers may be affixed to glass sheet 1682 while others are affixed to glass sheet 1683 while still others may float. In some embodiments some of the filaments 1689 may remain uncut or partially removed. During assembly of a VIG unit 1681, one mesh spacer 1685 or multiple mesh spacers 1685 may be used.

Referring to FIGS. 26 through 28, mesh support spacer 1685 may be placed on a glass sheet 1682 or 1683 with the aid of a jig that holds mesh 1688 and spacers 1687 and that precisely aligns spacers 1687. Cutting blades on a cutting head may run down the rows of spacers 1687 cutting and removing filaments 1689. The blade positions may be adjusted by photo sensors that detect the positions of spacers 1687. A cutting head may be used to cut and remove filaments while a mesh is held in the jig and before the spacers are placed on a glass sheet or after a mesh has been placed on a glass sheet.

Still referring to FIGS. 26 through 28, the array of spacers 1687 may be of any suitable geometry.

Still referring to FIGS. 26 through 28, mesh filaments 1689 may be removed before or after VIG unit 1681 is assembled by vaporization or melting through a thermal or other process or by dissolving by a liquid or gas environment or contact with such an environment. As part of a vaporization or melting process support spacers 1687 may be shielded from a thermal source.

Still referring to FIGS. 26 through 28, mesh filaments 1689 are equivalent to a sheet that interconnects spacers 1687.

Still referring to FIGS. 26 through 28, mesh filaments 1689 may not be removed and may remain between glass sheets 1682 and 1683 after VIG assembly.

Figure 29:
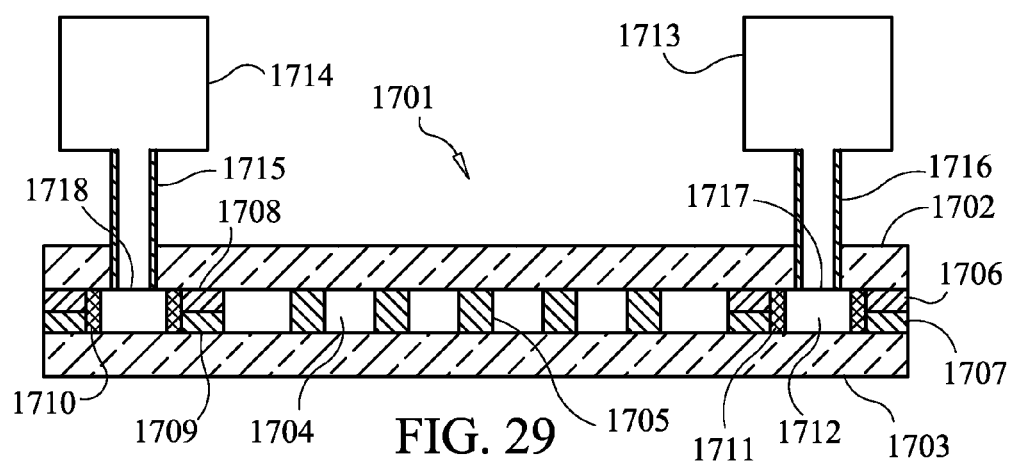
FIG. 29 is a cross sectional view of a VIG unit depicting how a viscous material may be pressured into a cavity between the glass sheets of a VIG unit according to one embodiment of this invention.

Referring to FIG. 29, a VIG unit 1701 comprises glass sheets 1702 and 1703 with a vacuum space 1704 at a pressure less than atmospheric pressure in between them. An array of support spacers 1705 may maintain separation of glass sheets 1702 and 1703. An edge seal may comprise outer strip spacers 1706 and 1707 and inner strip spacers 1708 and 1709. An edge seal may further comprise lubricating low vapor pressure viscous barriers 1710 and 1711. Strip spacers 1706, 1707, 1708, and 1709 along with viscous barriers 1710 and 1711 may define part of a cavity 1712 between glass sheets 1702 and 1703, which may include additional sub-cavities (not shown here), configured to contain a low permeability viscous material. Cavity 1712 may be part of a viscous edge seal. The bounding elements or barriers that define that part of a cavity in between the glass sheets of a VIG unit that is to contain a viscous material as part of an edge seal are not limited to the strip spacers or low vapor pressure viscous barriers that are recited above and shown in FIG. 29 but may include different, additional, and or fewer barrier elements just so long as they define in whole or in part a cavity that will contain a viscous material.

A cavity containing a viscous material that forms part of an edge seal for a VIG unit may be entirely between the glass sheets of that unit as depicted in FIGS. 3 and 7, it may be entirely outside the glass sheets as depicted in FIGS. 8 and 9, or it may be partially between and partially outside the glass sheets as depicted in FIG. 10.

A cavity containing a viscous material as part of an edge seal may or may not have its entire volume occupied by that viscous material.

Still referring to FIG. 29, a vacuum autoclave 1713 may degass or outgass a viscous material to be pressured into cavity 1712. A vacuum pump 1714 attached to cavity 1712 through connections 1715 may pump down cavity 1712 to a pressure less than atmospheric pressure. After cavity 1712 has been evacuated to a pressure less than atmospheric pressure, a viscous material may be pressured into cavity 1712, including any additional sub-cavities that form part of cavity 1712, through connections 1716 that may feed directly to vacuum autoclave 1713. The total pressure or total head necessary to cause flow of a viscous material into cavity 1712, including any additional sub-cavities that form part of cavity 1712, may be created by, but limited to, a press, screw, pump, hydrostatic pressure, or rotary extruder.

Still referring to FIG. 29, there may be multiple connections 1715 and multiple connections 1716 connected through multiple openings 1717 and 1718.

Still referring to FIG. 29, cavity 1712, including any additional sub-cavities that form part of cavity 1712, may not be evacuated to a pressure less than atmospheric before a viscous material is pressured into them.

Still referring to FIG. 29, a viscous material to be pressured into cavity 1712, including any additional sub-cavities that form part of cavity 1712, may not be degassed before being pressured into them.

It may be desirable that there be no gap or gaps between a viscous material and the boundaries of a cavity that contains it, where the cavity may or may not comprise sub-cavities, and also it may be desirable that there be no voids within a viscous material. If there are no gaps between a viscous material and the boundaries of a cavity or sub-cavity that contains it and if there are not voids in the viscous material then volume compatibility exists between the viscous material and its containing cavity or sub-cavity. If gaps form between a viscous material and the boundaries of a cavity or sub-cavity in which the viscous material is contained, then water that has permeated through elements of an edge seal may condense within that gap and, if the specific gravity of the viscous material is less than that of water, the condensed water may sink through the viscous material and make its way through further permeation into the vacuum space between the glass sheets of a VIG unit. This prospect primarily affects that part of a viscous edge seal that runs along the top of a VIG unit. Voids, should they develop in a viscous material, will present no barrier to gas flow and the overall permeability of a viscous edge seal may be increased by some small amount. Moreover, the volume of a cavity or sub-cavity containing a viscous material will change with changing temperatures as will the volume of the viscous material. If the volume of a cavity cannot expand to accommodate expansion of a viscous material, the pressure of the viscous material may rise to a level that may damage the edge seal. This problem can be avoided if the volume of a cavity is expandable. On the other hand the viscous material my contract to a volume less than that of the cavity that contains it. Should this happen a gap may open up between the top of the cavity and the viscous material as the viscous material seeks its own level under gravity and/or voids may form in the viscous material. This can be avoided if the cavity is collapsible. Thus, some embodiments of the present edge seals are designed with reversibly expandable and collapsible cavities and/or sub-cavities, such that the volume of the cavity in which the low permeability viscous material is contained or, if the cavity is comprised of two or more sub-cavities in fluid communication, at least the volume of the sub-cavity disposed between the glass sheets within the edge seal, is completely filled with the low permeability viscous material and remains so even when changing temperatures change the volume of the viscous material and the cavity or sub-cavity.

In order for a cavity containing a viscous material to be collapsible, at least a portion of a cavity boundary must be configured to deform or move under an applied pressure. This pressure may be the result of atmospheric air pressure and or it may be mechanically induced, such as by a spring or elastic material deformation, which may be compressive or tensile or both. It may also be the result of the weight of some portion of a material enclosing a cavity or sub-cavity. The same source of pressure that maintains a flexible and or elastic portion of a cavity or sub-cavity in contact with an expanding and contracting viscous material may also raise the pressure of the viscous material and may raise the pressure of the viscous material so that no portion of it is below atmospheric pressure. This raised pressure may to serve to maintain volume compatibility between a viscous material and its cavity or sub-cavity and also serve to cause no voids to form in the viscous material as it contracts. FIG. 30 shows one example of such a cavity design. FIG. 30 depicts a scenario where a cavity containing viscous material as part of an edge seal for a VIG unit comprises a sub-cavity that is disposed between the glass sheets of the VIG unit and is in communication with other sub-cavities that are not disposed between the glass sheets. Referring to FIG. 30, a VIG unit includes two glass sheets 1815 and 1816 separated by a vacuum gap 1817 at a pressure less than atmospheric pressure. Support spacers 1818 that may be affixed to either sheet 1815 or 1816 in between glass sheets 1815 and 1816 maintain vacuum gap 1817 by resisting the compressive load of atmospheric pressure. Strip spacers 1819 and 1821 are affixed to glass sheet 1816 and strip spacers 1820 and 1822 are affixed to glass sheet 1815. In between strip spacers 1819 and 1821 and strip spacers 1820 and 1822 and glass sheets 1815 and 1816 is a low permeability viscous material 1823. In between viscous material 1823 and strip spacers 1819, 1820, 1821 and 1822 is a viscous barrier material 1824. Viscous barrier material 1824 provides a viscous barrier that resists creep of viscous material 1823 between spacers 1819 and 1820 and between spacers 1821 and 1822. Viscous material 1823 is also contained within flexible diaphragm 1827 and passes through port 1826 in glass sheet 1815 so that viscous material 1823 contained in the flexible diaphragm 1827 is in communication with viscous material 1823 in between glass sheets 1815 and 1816. Flexible diaphragm 1827 and port 1826 define sub-cavities of the cavity configured to contain the viscous material that are not between glass sheets 1815 and 1816, while the space bounded by glass sheets 1815 and 1816 and viscous barrier material 1824 define a sub-cavity that is between glass sheets 1815 and 1816. As the volume of viscous material 1823 expands and contracts with changing temperatures, volume compatibility between viscous material 1823 and the confines between glass sheets 1815 and 1816 is maintained by viscous material 1823 being pressured out and in through port 1826. Rigid cell 1825 contains flexible diaphragm 1827 and is evacuated to a pressure less than atmospheric pressure. Springs 1829 exert pressure on plate 1828 which in turn exerts pressure on diaphragm 1827. Flexible diaphragm 1827 may comprise without limitation metal and plastic laminates that have low gas and moisture permeability or other suitable laminates or coated materials. The volume of the sub-cavity defined by flexible diaphragm 1827 will change as viscous material 1823 flows in and out of it. Springs 1829 maintain sufficient force against plate 1828 to in turn exert sufficient pressure against flexible diaphragm 1827 so that viscous material 1823 always fills the sub-cavity between glass sheets 1815 and 1816. The flexible diaphragm may comprise a material capable of undergoing reversible flexible and or elastic deformation (e.g., an elastomer). For example, flexible diaphragm 1912 may comprise, without limitation, metal/plastic laminates or other suitable materials that may have low gas and moisture permeability.

FIG. 31 depicts another embodiment of a VIG unit having an edge seal that includes a reversibly expandable and collapsible cavity containing a low permeability viscous material. This VIG unit with a viscous edge seal comprises two glass sheets 1901 and 1902 separated by a vacuum gap 1903 at a pressure less than atmospheric pressure. Support spacers 1904 in between glass sheets 1901 and 1902 maintain vacuum gap 1903 by resisting the compressive load of atmospheric pressure. Strip spacers 1905 and 1908 may be affixed to glass sheet 1902 and strip spacers 1907 and 1909 may be affixed to glass sheet 1901. In between the strip spacers is a low permeability viscous material 1910. In between viscous material 1910 and strip spacers 1905, 1907, 1908 and 1909 is viscous barrier material 1911. Viscous barrier material 1911 provides a viscous barrier configured to resist creep of viscous material 1910 between spacers 1908 and 1909 and between spacers 1905 and 1907. Viscous material 1910 is also held within flexible diaphragm 1912 and passes through port 1913 in glass sheet 1901. Flexible diaphragm 1912 and port 1913 define sub-cavities of the cavity configured to contain the viscous material that are not between glass sheets 1901 and 1902, while the space bounded by glass sheets 1901 and 1902 and viscous barrier material 1911 define a sub-cavity 1914 that is between glass sheets 1901 and 1902. As the volume of viscous material 1910 expands and contracts with changing temperatures, volume compatibility between viscous material 1910 and the confines between glass sheets 1901 and 1902 is maintained by viscous material 1910 being pressured in and out of sub-cavity 1915 through port 1913. Sub-cavity 1915 is reversibly expandable and collapsible. Because the top level of viscous material 1910 in the sub-cavity 1915 defined by flexible diaphragm 1912 is higher than the top of the sub-cavity 1914 defined between glass sheets 1901 and 1902 and viscous barrier material 1911, hydrostatic pressure assures that viscous material 1910 will always fill the sub-cavity 1914 between glass sheets 1901 and 1902. Atmospheric pressure will maintain contact between flexible diaphragm 1912 and viscous material 1910 in sub-cavity 1915. Sub-cavity 1915 could be lower than the top of sub-cavity 1914 provided that atmospheric pressure was always high enough to overcome hydrostatic pressure in viscous material 1910 to maintain volume compatibility between viscous material 1910 and its cavity. The flexible diaphragm may comprise a material capable of undergoing reversible flexible and or elastic deformation (e.g., an elastomer). For example, flexible diaphragm 1912 may comprise without limitation metal/plastic laminates or other suitable materials that may have low gas and moisture permeability.

FIG. 32 shows a cross-sectional view through the top edge seal of a VIG unit with a viscous edge seal. The VIG unit with viscous edge seal comprises two glass sheets 2040 and 2041 separated by a vacuum gap 2042 at a pressure less than atmospheric pressure. Support spacers 2043 in between glass sheets 2040 and 2041 maintain vacuum gap 2042 by resisting the compressive load of atmospheric pressure. Strip spacer 2044 is affixed to glass sheet 2041 and strip spacer 2045 is affixed to glass sheet 2040. In between glass sheets 2040 and 2041 is a low permeability viscous material 2047. In between viscous material 2047 and strip spacers 2044 and 2045 is a viscous barrier material 2046. Viscous barrier material 2046 provides a viscous barrier configured to resist creep of viscous material 2047 between spacers 2044 and 2045. On top of viscous material 2047 is at least one capping material 2048. Capping material 2048 has a lower specific gravity than viscous material 2047 so it floats on top of viscous material 2047. As the volume of viscous material 2047 expands and contracts with changing temperatures the level of its top surface 2049 will rise and fall in between glass sheets 2040 and 2041, as will capping material 2048. In this manner, the capping material provides a reversibly movable boundary for the cavity defined by glass sheets 2040 and 2041, the capping material, and the upper portion of viscous barrier material 2046. Capping material 2048 may be composed of a material through which water droplets will not pass or sink. As such, it provides a protective cap over viscous material 2047. Capping material 2048 may comprise a solid, semi-solid or a liquid material and may be flexible or rigid. Capping material may comprise a single material or a combination of materials, including without limitation, stiff grease, or wax. Capping material is desirably dimensioned such that it substantially covers the area of the top surface 2049 of viscous material 2047. If capping material 2048 is a solid material it is desirably dimensioned such that it substantially covers the top surface 2049, but is still able to move laterally up and down in between glass sheets 2040 and 2041. Capping material 2048, which floats on viscous material 2047, may, as a result of its weight, increase the pressure in viscous material 2047 where the two contact to a pressure above atmospheric pressure, even if only slightly. In this case, because the collapsible portion of the cavity containing viscous material 2047 includes the highest point of the cavity, the pressure necessary to maintain contact between viscous material 2047 and the sub-cavity defined between the two glass sheets need not overcome hydrostatic pressure. The seals on the sides and bottom of the unit depicted in FIG. 32 are similar to that shown in FIG. 31 except that there is no diaphragm 1912 or port 1913 as depicted in FIG. 31.

Figure 33:
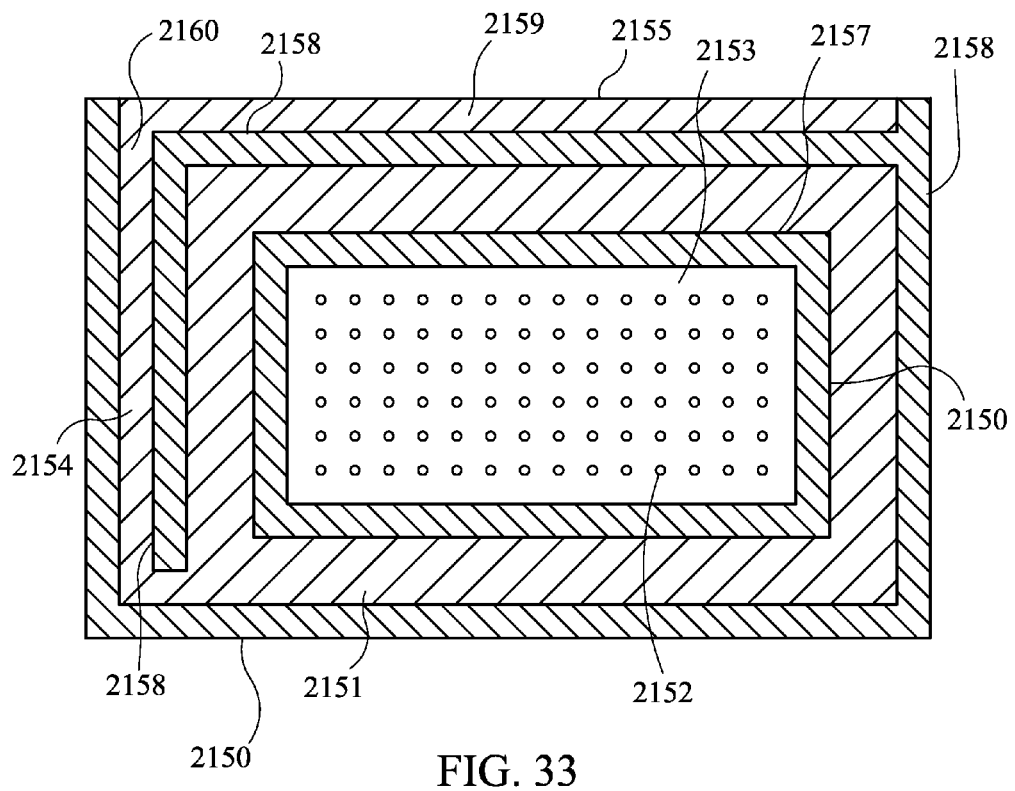
FIG. 33 is a sectional plan view of a VIG unit with a viscous edge seal according to one embodiment of this invention.

FIG. 33 depicts a sectional plan view of another embodiment of a VIG unit comprising a viscous edge seal that includes a cavity that provides an open, free surface for the viscous material contained therein. In this embodiment, the edge seal comprises a plurality of walls 2150 that define a cavity configured to contain the low permeability viscous material 2151. The cavity comprises a first sub-cavity disposed around the periphery of the vacuum space 2153 in between the two glass sheets, such that it peripherally surrounds vacuum space 2153. The spacers 2152 that maintain separation of the glass sheets are shown. As shown in FIG. 33, the first sub-cavity can be formed between an inner barrier comprising four wall segments 2157 disposed in a rectangular configuration around vacuum space 2153 and an outer barrier comprising four wall segments 2158 disposed in a rectangular configuration, also around vacuum space 2153, and spaced apart from wall segments 2157. The cavity further comprises a second sub-cavity that defines a reservoir 2159 at the top of the VIG unit. Reservoir 2159 is open at the top, such that viscous material 2151 contained within it will have a free surface 2155. A third sub-cavity connects reservoir 2159 and the first sub-cavity. The opening 2160 between this third sub-cavity and the second sub-cavity is desirably located below the upper edge of the two glass sheets. Thus, as shown in FIG. 33, the third sub-cavity may comprise a vertical channel 2154 extending downward from reservoir 2159 to the bottom of the first sub-cavity. In this edge seal design, as the volume of viscous material 2151 expands and contracts with changing temperatures it is free to exude up and down through channel 2154 with a free surface 2155 at the top of the window that will rise and fall. If viscous material 2151 has a specific gravity of less than one, any water condensation that sinks down channel 2154 will remain sequestered at the bottom of the VIG unit. It should be noted that if viscous material 2151 is a low molecular weight PIB that flows easily, as opposed to a grease, then hydrostatic pressure may be sufficient to assure that viscous material 2151 always contacts the walls of the cavity without voids. The methods presented here to maintain sufficient pressure to keep a cavity filled with viscous material without voids are illustrative only and not limiting.

Figure 34:
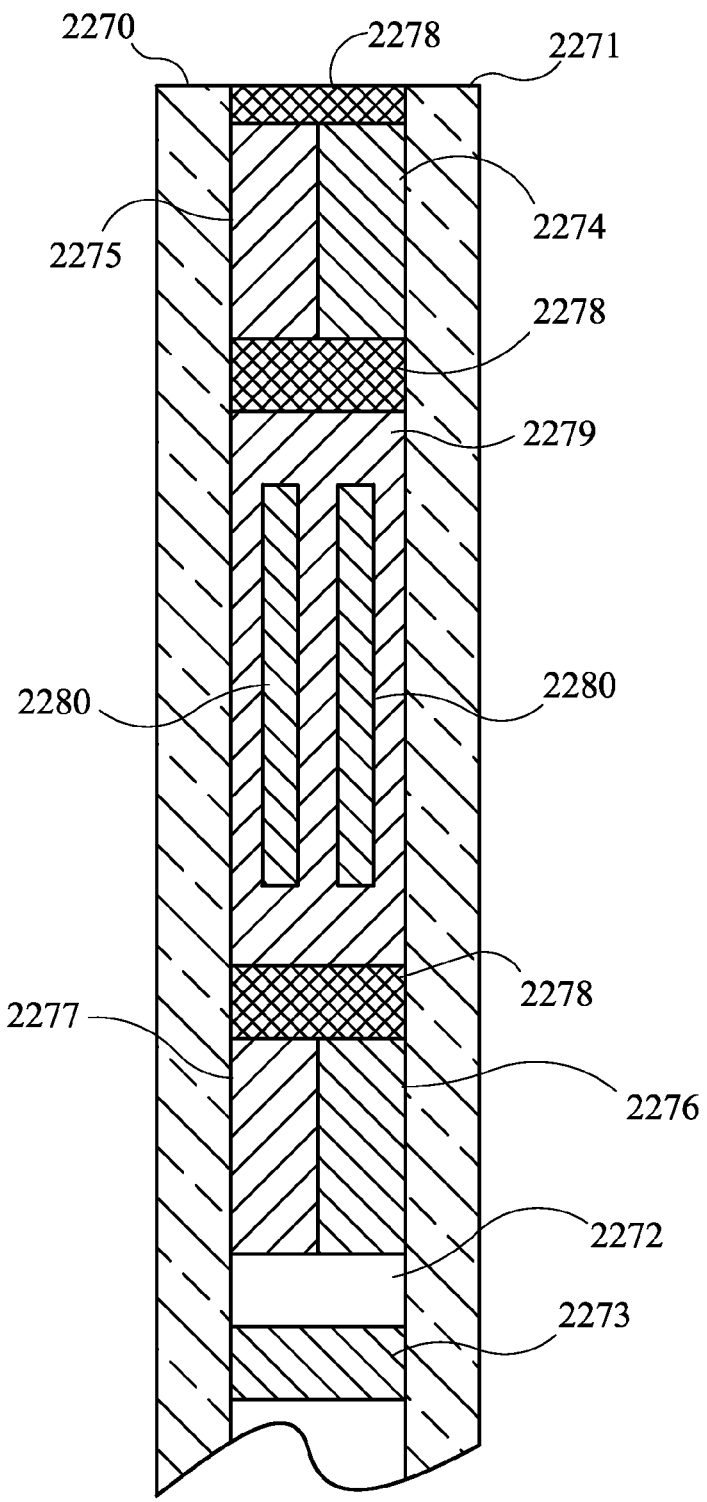
FIG. 34 is a cross sectional view of a viscous edge seal for a VIG unit according to one embodiment of this invention.

FIG. 34 is a diagram showing a cross-sectional view through the top edge seal of a VIG unit having a design similar to that shown in FIG. 3. The VIG unit with a viscous edge seal comprises two glass sheets 2270 and 2271 separated by a vacuum gap 2272 at a pressure less than atmospheric pressure. Support spacers 2273 in between glass sheets 2270 and 2271 maintain vacuum gap 2272 by resisting the compressive load of atmospheric pressure. Strip spacers 2274 and 2276 are affixed to glass sheet 2271 and strip spacers 2275 and 2277 are affixed to glass sheet 2270. In between the strip spacer pairs 2274, 2275 and 2276, 2277 is a low permeability viscous material 2279. In between viscous material 2279 and strip spacer pairs 2274, 2275 and 2276, 2277 is a viscous barrier material 2278. Viscous barrier material 2278 provides a viscous barrier configured to resist creep of low gas permeability viscous material 2279 between spacers 2277 and 2276. In this embodiment, one or more solid gas-permeation barriers 2280 are embedded or substantially embedded in low permeability viscous material 2279. Barriers 2280 are solid barriers comprising a material having a lower gas permeability than viscous material 2279. As a result, solid gas-permeation barriers can reduce the rate of gas diffusion through the edge seal. Additionally, the material from which barriers 2280 are comprised may be chosen such that its coefficient of thermal expansion is lower than that of the material from which strip spacers 2274, 2275, 2276, and 2277 are comprised. Non-limiting examples of suitable materials for solid barriers 2280 include metals and metal alloys, such as nickel iron alloys. One example of a commercially-available nickel iron alloy is known as Invar.

Solid barriers 2280 may be completely embedded in viscous material 2279, such that they are surrounded by the viscous material and not fixedly attached to either of glass sheets 2270 or 2271 and, therefore, are freely suspended in viscous material 2279, although they may have intermittent contact with the glass sheets. Alternatively, solid barriers 2280 may be substantially embedded in viscous material 2279 in that they may be fixedly attached to one or both of glass sheets 2270 or 2271 as a means to maintain their positions and or standoff from glass sheets 2270 and 2271. Solid barriers 2280 may have a variety shapes. For example, as shown in FIG. 34, they may be elongated along an axis running parallel to the faces of glass sheets 2270 or 2271. Thus, the solid barriers may be in the form of thin strips of material. By way of illustration only, in some embodiments the thin strips may have aspect ratios (i.e., width to thickness ratios) of at least about 10:1, at least about 100:1, or at least about 1000:1. By way of further illustration, the solid barriers may be provided in the form of a powdered flake material. The number and volume of solid barriers 2280 are desirably selected such that they occupy a substantial volume of viscous material 2279, but still allow at least a portion of the gap between glass sheets 2270 and 2271 to be spanned entirely by viscous material 2279 and such that they help to maintain volume compatibility between viscous material 2279 and its confines between glass sheets 2270 and 2271, as discussed below. For example, in some embodiments of the edge seals, the solid gas-permeation barriers 2280 occupy between about 50 and 99%, for example between about 70 and 99%, of the volume of the cavity or sub-cavity in which the low permeability viscous material is contained in between the glass sheets.

In the embodiment of FIG. 34, volume compatibility between viscous material 2279 and its confines may be maintained by at least three means. First, the gap between strip spacers 2275 and 2274 is such that viscous barrier material 2278 may exude in and out between spacers 2275 and 2274 under sufficient pressure that would be induced with changing volume of viscous material 2279 and the volume of its confines. Second, pressure induced flexure of glass sheets 2270 and 2271 resulting in part from a volume change in viscous material 2279 and its confines. And third, thermal expansion and contraction of strip spacers 2274, 2275, 2276, and 2277 would correspond as close as possible to the distance between glass sheets 2270 and 2271 necessary to maintain volume compatibility between viscous material 2279 and its confines. For example, if the distance between glass sheets 2270 and 2271 was 0.04 inch, spacers 2274, 2275, 2276, and 2277 were made of polycarbonate, viscous material 2279 was PIB, and solid barriers 2280 were Invar, each with a thickness of 0.0185 inch, then changing distances between glass sheets 2270 and 2271 resulting from expansion and contraction of spacers 2274, 2275, 2276, and 2277 would result in a volume change in the intra-glass sheet cavity in which viscous material 2279 is contained equal to the volume change in material 2279. Stated another way, the low coefficient of thermal expansion of Invar barriers 2280 offsets the higher coefficient of thermal expansion of viscous material 2279 to help to maintain volume compatibility between viscous material 2279 and its confines between glass sheets 2270 and 2271.

FIGS. 35 and 36 show cross-sectional views through an edge seal of a VIG unit that includes strip spacers that comprise a continuous material having a folded over form. The folded over forms may be a product of a molding process or achieved by folding over forms that are initially flat. The VIG unit with viscous edge seal comprises two glass sheets 2301 and 2302 separated by a vacuum space 2303 at a pressure less than atmospheric pressure. Support spacers 2304 in between glass sheets 2301 and 2302 maintain vacuum gap 2303 by resisting the compressive load of atmospheric pressure. Strip spacers 2305 and 2306 may be affixed to panes 2301 and 2302. In between strip spacers 2305 and 2306 and glass sheets 2301 and 2302 may be a low gas permeability viscous material 2307. Viscous material 2307 may comprise without limitation PIB. Viscous material 2307 may comprise without limitation a vacuum pump fluid such as DuPont's Krytox VPF. Viscous material 2307 may comprise without limitation vacuum grease. Viscous material 2307 may comprise without limitation vacuum grease such as Dupont's Krytox LVP high-vacuum grease. Strip spacers 2305 and 2306 may comprise an elastomer. Suitable elastomers may include, without limitation, butyl rubber, Kalrez perfluoroelastomer, and fluoropolymers such as Viton. Kalrez and Viton are registered trademarks of DuPont Performance Elastomers.

Strip spacers 2305 and 2306 each comprises a continuous piece of material running along an edge of the VIG unit in between glass sheets 2301 and 2302. Each strip spacer comprises a first flap 2310, a second flap 2311 and a joint 2312 that connects first flap 2310 to second flap 2311. First flap 2310 comprises a first face 2313 in contact with glass sheet 2301 and an oppositely facing second face 2314. Similarly, second flap 2311 comprises a first face 2315 in contact with glass sheet 2302 and an oppositely facing second face 2316. In the embodiment of FIG. 35, joint 2312 connects the first and second flaps such that the second face 2314 of first flap 2310 and the second face 2316 of second flap 2311 press against one another, such that strip spacers 2305 and 2306 span the gap between glass sheets 2301 and 2302 and such that strip spacer 2306 restrains viscous material 2307 from entering vacuum space 2303. The joint portion of the continuous piece of material may be thinner than the flap portions, such that gaps 2317 and 2318 are provided between joint 2312 and glass sheet 2301 and between joint 2312 and glass sheet 2302, respectively. As shown in the figure, in this embodiment joints 2312 extend into viscous material 2307 which fills gaps 2317 and 2318.

Notably, the embodiment of FIG. 35 presents yet another way that sufficient pressure may be maintained in a viscous material contained in a closed cavity so that it always fills the cavity without voids or gaps. Sufficient pressure may be in part maintained by elastic compression of strip spacers 2305 and 2306. Viscous material 2307 is contained in a cavity 2320 bounded by glass sheets 2301 and 2302 and by strip spacers 2305 and 2306. Cavity 2320 is reversibly expandable and collapsible through elastic deformation of strip spacers 2305 and 2306 and in particular those portions 2323 of strip spacers 2305 and 2306 that extend into viscous material 2307.

FIG. 36 depicts the VIG unit in FIG. 35 after glass sheets 2301 and 2302 have moved laterally with respect to one another, as when there is differential thermal strain. Strip spacers 2305 and 2306 roll and deform as shown in FIG. 36. In addition to rolling deformation, strip spacers 2305 and 2306 undergo elastic deformation. During this process first flap 2310 and second flap 2311 move laterally with respect to each other. Second faces 2314 and 2316 may be in direct contact as they are pressed against one another, or there may be additional materials 2308, such as lubricating materials, between second faces. Such additional materials 2308 may comprise, without limitation, vacuum grease, molybdenum disulfide, and strips of other materials, such as but without limitation, stainless steel.

Figure 37:
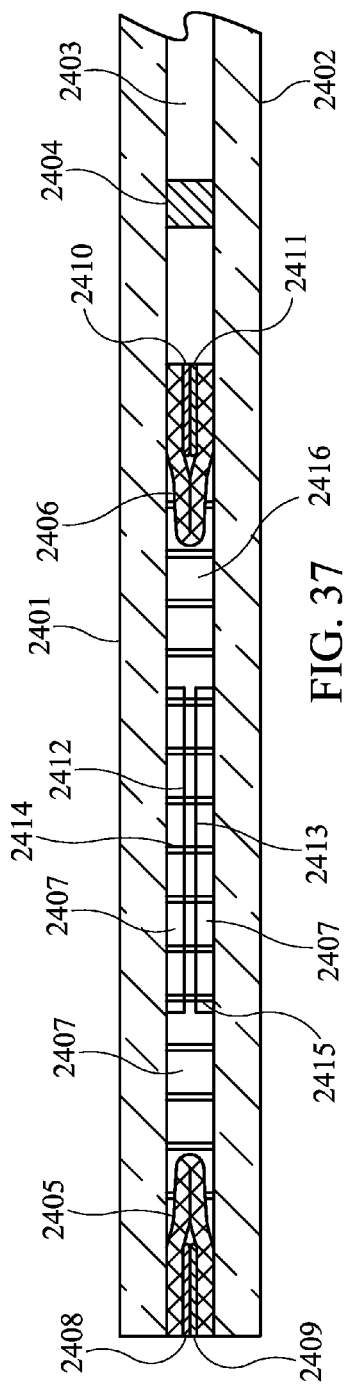
FIG. 37 is a cross sectional view of a viscous edge seal for a VIG unit according to one embodiment of this invention.

FIG. 37 depicts a cross section of an edge seal of a VIG unit with viscous edge seal. The unit comprises two glass sheets 2401 and 2402 separated by a vacuum space 2403 that is at a pressure less than atmospheric pressure. Support spacers 2404 in between glass sheets 2401 and 2402 maintain vacuum gap 2403 by resisting the compressive load of atmospheric pressure. In between strip spacers 2405 and 2406 and glass sheets 2401 and 2402 may be a viscous material 2407. Viscous material 2407 may comprise without limitation PIB. Viscous material 2407 may comprise without limitation a vacuum pump fluid such as Krytox VPF. Viscous material 2407 may comprise without limitation vacuum grease. Viscous material 2407 may comprise without limitation vacuum grease such as Krytox LVP high-vacuum grease. Viscous material 2407 may comprise without limitation molybdenum disulfide and/or polytetraflouroethylene (PTFE) powder or other fillers. Strip spacers 2405 and 2406 may comprise an elastomer. Suitable elastomers may include, without limitation, butyl rubber, Kalrez perfluoroelastomer, and fluoropolymers such as Viton.

Figure 38:
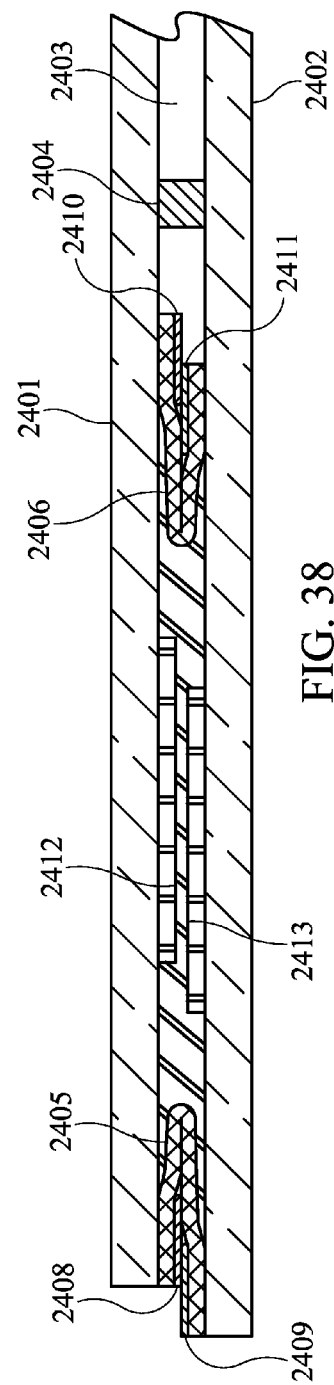
FIG. 38 is a cross sectional view of a viscous edge seal for a VIG unit according to one embodiment of this invention.
Figure 39:
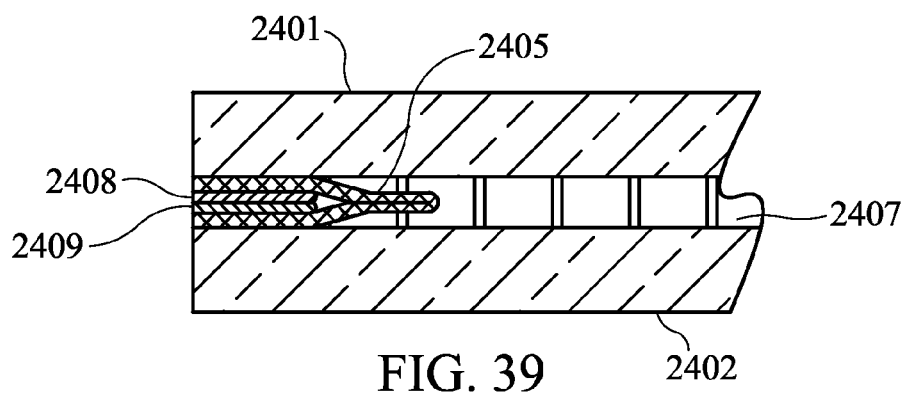
FIG. 39 is a detail the cross sectional view of a viscous edge seal for a VIG unit depicted in FIG. 37.
Figure 40:
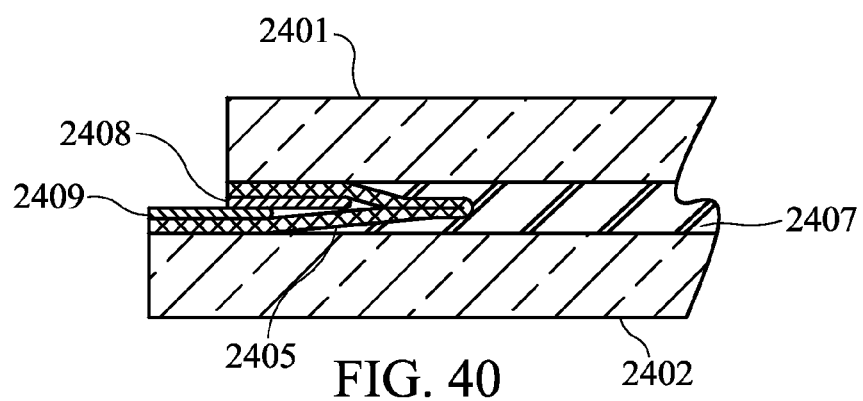
FIG. 40 is a detail the cross sectional view of a viscous edge seal for a VIG unit depicted in FIG. 38.

Strip spacers 2405 and 2406 of the edge seal have the same design as strip spacers 2305 and 2306 of FIG. 35. However, in order to accommodate manufacturing dimensional tolerances for the strip spacers, it may be desirable for the edge seal to further comprise one or more shim spacers positioned and dimensioned such that the total thickness of a strip spacer and its shim spacer(s) is the same as the thickness of the support spacers 2404. As shown in FIG. 37 the one or more shim spacers (in this case two: 2408, 2409 and 2410, 2411) may be disposed between the second face of the first flap and the second face of the second flap, such that the second faces press against one another indirectly through the shim spacers. Shim spacers 2408, 2409, 2410, and 2411 may be metallic and may comprise without limitation stainless steel. Shim spacers 2408, 2409, 2410, and 2411 may act as bearing surfaces against each other. The thicknesses of shim spacers 2408 and 2409 may be chosen, for example, such that the total thickness of shim spaces 2408, 2409 and strip spacer 2405 is the same as the thickness of support spacer 2404. Likewise the thicknesses of shim spacers 2410 and 2411 may be chosen, for example, such that the total thickness of shim spacers 2410, 2411 and strip spacer 2406 is the same as the thickness of support spacer 2404. In between strip spacers 2405 and 2406, and glass sheets 2401 and 2402 is a viscous material 2407. Imbedded within viscous material 2407 are imbedded strips 2412 and 2413. Imbedded strip 2412 may contact or be affixed to glass sheet 2401 and imbedded strip 2413 may contact or be affixed to glass sheet 2402. Imbedded strips 2412 and 2413 may have a lower permeability than viscous material 2407 and may reduce the rate at which gas permeates into the vacuum space 2403. There may be openings in imbedded strip spacers 2412 and 2413 such that viscous material 2407 can pass freely between sub-cavities 2413, 2414, and 2415. FIG. 38 depicts the same cross section as FIG. 37 with glass sheet 2401 having moved laterally with respect to glass sheet 2402 as would result from differential thermal strain. FIG. 39 is an enlarged detail of the left end of FIG. 37 and FIG. 40 is an enlarged detail of the left end of FIG. 38.

Figure 41:
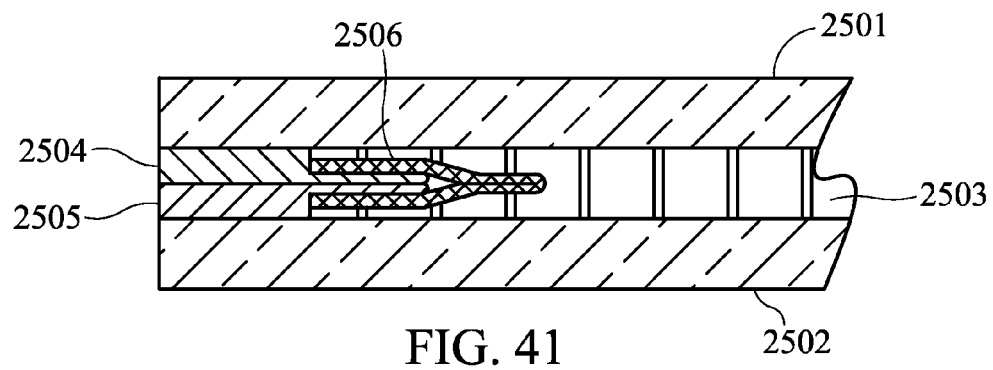
FIG. 41 is a cross sectional view of a portion of a viscous edge seal for a VIG unit according to one embodiment of this invention.
Figure 42:
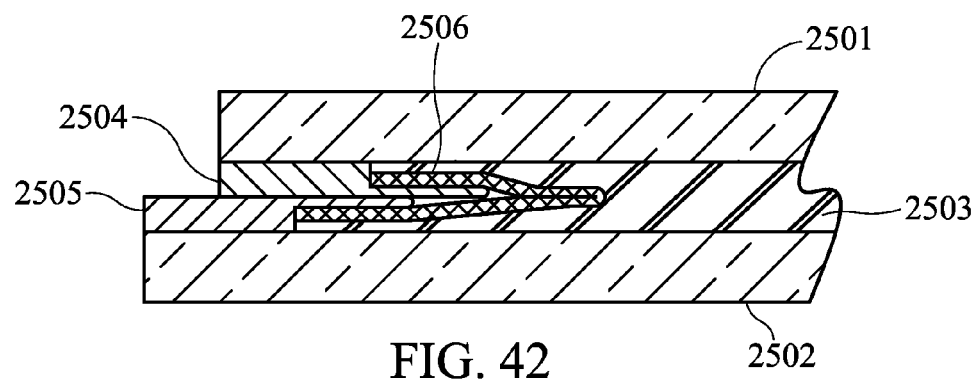
FIG. 42 is a cross sectional view of a portion of a viscous edge seal for a VIG unit according to one embodiment of this invention.

FIG. 41 depicts a cross section of an outer edge of a viscous edge seal of a VIG unit. The VIG unit comprises glass sheets 2501 and 2502. 2503 is a viscous material. Viscous material 2503 may comprise without limitation PIB. Viscous material 2503 may comprise without limitation a vacuum pump fluid such as Krytox VPF. Viscous material 2503 may comprise without limitation vacuum grease. Viscous material 2503 may comprise without limitation vacuum grease such as Krytox LVP high-vacuum grease. 2504 and 2505 are strip spacers that may be without limitation stainless steel. 2506 is an elastic or flexible membrane cap that is attached to strip spacers 2504 and 2505. Membrane cap 2506 may comprise an elastomer. Suitable elastomers may include, without limitation, butyl rubber, Kalrez perfluoroelastomer, and fluoropolymers such as Viton. FIG. 42 depicts the same cross section as FIG. 41 with glass sheet 2501 having moved laterally with respect to glass sheet 2502 as would result from differential thermal strain.

Figure 43:
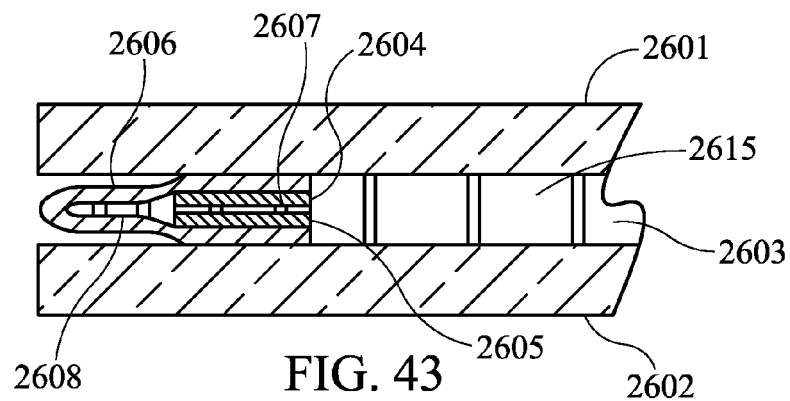
FIG. 43 is a cross sectional view of a portion of a viscous edge seal for a VIG unit according to one embodiment of this invention.

FIG. 43 depicts a cross section of an outer edge of a viscous edge seal of a VIG unit. The VIG unit comprises glass sheets 2601 and 2602. 2603 is a viscous material. Viscous material 2603 may comprise without limitation PIB. Viscous material 2603 may comprise without limitation a vacuum pump fluid such as Krytox VPF. Viscous material 2603 may comprise without limitation vacuum grease. Viscous material 2603 may comprise without limitation vacuum grease such as Krytox LVP high-vacuum grease. Strip spacer 2606 has strip spacers 2604 and 2605 imbedded within it. Strip spacer 2606 may comprise an elastomer. Suitable elastomers may include, without limitation, butyl rubber, Kalrez perfluoroelastomer, and fluoropolymers such as Viton. Gaps 2607 between strip spacers 2604 and 2605 allow movement of viscous material 2603 in and out of the sub-cavity sack 2608 within strip spacer 2606. The volume of the sub-cavity sack 2608 increases and decreases as viscous material 2603 moves in and out of it through gaps 2607. The movement of viscous material 2603 through gaps 2607 maintains volume compatibility between viscous material 2603 and sub-cavity 2615 between glass sheets 2601 and 2602. Strip spacers 2604 and 2605 may comprise without limitation stainless steel.

FIG. 43 presents another way sufficient pressure may be maintained in a viscous material contained in a closed cavity so that it always fills the cavity without voids. Sufficient pressure may be created in viscous material 2603 by the elastic elongation of the sub-cavity sack portion 2608 of strip spacer 2606 and or by atmospheric pressure. The cavity containing viscous material 2615 is reversibly expandable and collapsible because sub-cavity 2608 is reversibly expandable and collapsible either through flexible change in shape, elastic deformation or both.

Any method to seal a VIG unit that comprises two glass sheets with a vacuum space in between must include one or more low gas permeability materials that bridge or span the gaps between the glass sheets so as to seal off and maintain the vacuum. The most advantageous places to bridge those gaps are in the edge regions of the glass sheets. Examples in the art show that combinations of different materials may be used to bridge the gaps. Those materials may be configured in literally an infinite number of ways. As examples, the materials may be entirely between the glass sheets, or entirely outside the space between the glass sheets, or they may be partially between the glass sheets.

The commonality among the infinite number of possible embodiments for this invention is that a viscous material bridges or spans some portion of the gap between the glass sheets of a VIG unit and that relative lateral movement between the glass sheets is accommodated by the viscous material undergoing viscous shear. It is contemplated that the scope of this invention encompasses all of the infinite number of ways that a viscous material might be configured and constrained so as to function in the above described manner.

REFERENCES CITED: OTHER PUBLICATIONS

Jousten K, editor. Handbook of Vacuum Technology. Weinheim, Germany: Wiley-VCH; 2008. 1002 p.
Le Bourhis E. 2008. Glass, Mechanics and Technology. Weinheim, Germany: Wiley-VCH. 366 p.
Macosko C. W. 1994. Rheology, Principles, Measurements, and Applications. New York: Wiley-VCH. 550 p.
Morrison F. A. 2001. Understanding Rheology. New York: Oxford University Press. 545 p.
Nippon Sheet Glass. 2003. Precaution For Use and Maintainance [sic]. 1 screen. Available from: http://www.nsg-spacia.co.jp/tech/warranty.html
O'Hanlon J. F. 2003. A User's Guide to Vacuum Technology, 3rd Ed. Hoboken, N.J.: John Wiley & Sons. 516 p.
Roth A. 1994. Vacuum Sealing Techniques. Woodbury, N.Y.: American Institute of Physics. 845 p.

What is claimed is:

1. A vacuum insulating glass (VIG) unit comprising:
   (a) a first glass sheet and a second glass sheet with a vacuum space in between at a pressure less than atmospheric pressure;
   (b) at least one spacer in between the first and second glass sheets configured to contribute to the separation of the first and second glass sheets and the maintenance of the vacuum space; and
   (c) an edge seal comprising:
      (i) a viscous material that flows like a liquid when a force is applied and has a viscosity no greater than 10,000 mPa*s at 20° C., wherein the viscous material restricts the rate at which gas permeates into the vacuum space; the edge seal being configured to allow the first and second glass sheets to move laterally relative to one another when the first and second glass sheets experience differential thermal strain and further configured such that viscous shear occurs within at least a portion of the viscous material when there is relative lateral movement between the first and second glass sheets; and
      ii) at least one cavity that contains at least a portion of the viscous material, wherein at least a portion of a boundary defining the cavity is reversibly expandable and collapsible such that the viscous material and the cavity are configured to maintain volume compatibility when one or both of the viscous material and the cavity undergo a temperature-induced volume change.

2. The VIG unit of claim 1, further comprising a solid material embedded within the viscous material, the solid material having a lower gas permeability than the viscous material.

3. The VIG unit of claim 2, wherein the solid material is in contact with one of the first and second glass sheets.

4. The VIG unit of claim 2, wherein the solid material is affixed to one of the first and second glass sheets.

5. The VIG unit of claim 2, wherein the solid material is not in contact with or affixed to either of the first and second glass sheets.

6. The VIG unit of claim 1, further comprising polytetrafluoroethylene powder embedded within the viscous material.

7. The VIG unit of claim 1, wherein at least a portion of the boundary defining the cavity comprises a material capable of undergoing at least one of elastic or flexible deformation, such that it renders the cavity reversibly expandable and collapsible.

8. The VIG unit of claim 7, wherein the portion of the boundary comprising a material capable of undergoing at least one of elastic or flexible deformation comprises a diaphragm that defines a sub-cavity of the cavity, wherein the sub-cavity is not disposed in between the first and the second glass sheets.

9. The VIG unit of claim 7, wherein the portion of the boundary comprising a material that is capable of undergoing at least one of elastic or flexible deformation is disposed in between, and spans the gap in between, the first and second glass sheets.

10. The VIG unit of claim 1, wherein at least a portion of the boundary defining the cavity comprises a capping material that floats on the viscous material and is configured to move reversibly in between the first and second glass sheets when one or both of the viscous material and the cavity undergo a temperature-induced volume change.

11. A vacuum insulating glass (VIG) unit comprising:
   (a) a first glass sheet and a second glass sheet with a vacuum space in between at a pressure less than atmospheric pressure;
   (b) at least one spacer in between the first and second glass sheets configured to contribute to the separation of the first and second glass sheets and the maintenance of the vacuum space; and
   (c) an edge seal comprising:
      (i) a viscous material that flows like a liquid when a force is applied and has a viscosity no greater than 10,000 mPa*s at 20° C., wherein air permeates through the viscous material and into the vacuum space in the assembled vacuum insulating glass unit; the edge seal being configured to allow the first and second glass sheets to move laterally relative to one another when the first and second glass sheets experience differential thermal strain and further configured such that viscous shear occurs within at least a portion of the viscous material when there is relative lateral movement between the first and second glass sheets; and (ii) at least one cavity that contains at least a portion of the viscous material, wherein at least a portion of a boundary defining the cavity is reversibly expandable and collapsible such that the viscous material and the cavity are configured to maintain volume compatibility when one or both of the viscous material and the cavity undergo a temperature-induced volume change.

\* \* \* \* \*